(12) United States Patent
Kotimäki et al.

(10) Patent No.: US 12,163,456 B2
(45) Date of Patent: Dec. 10, 2024

(54) EXHAUST GAS AFTERTREATMENT MIXER

(71) Applicant: Proventia Oy, Oulunsalo (FI)

(72) Inventors: Eero Kotimäki, Oulunsalo (FI); Aki Kärnä, Oulunsalo (FI)

(73) Assignee: Proventia Oy, Oulunsalo (FI)

( * ) Notice: Subject to any disclaimer, the term of this patent is extended or adjusted under 35 U.S.C. 154(b) by 0 days.

(21) Appl. No.: 18/544,598

(22) Filed: Dec. 19, 2023

(65) Prior Publication Data

US 2024/0209765 A1    Jun. 27, 2024

(30) Foreign Application Priority Data

Dec. 22, 2022    (FI) ..................... 20226155

(51) Int. Cl.
*F01N 13/08*    (2010.01)
*F01N 3/28*     (2006.01)

(52) U.S. Cl.
CPC ........ *F01N 3/2892* (2013.01); *F01N 2240/20* (2013.01); *F01N 2610/02* (2013.01)

(58) Field of Classification Search
CPC . F01N 3/2892; F01N 2240/20; F01N 2610/02
See application file for complete search history.

(56) References Cited

U.S. PATENT DOCUMENTS

| | | | | |
|---|---|---|---|---|
| 9,371,764 | B2 * | 6/2016 | Moran | F01N 3/035 |
| 2016/0215673 | A1 * | 7/2016 | Noren, IV | B01F 25/4521 |
| 2016/0361694 | A1 * | 12/2016 | Brandl | B01F 25/103 |
| 2018/0326372 | A1 * | 11/2018 | Tyni | B01F 23/213 |
| 2019/0323402 | A1 | 10/2019 | Tucker et al. | |
| 2021/0039056 | A1 * | 2/2021 | De Rudder | F01N 3/2892 |
| 2021/0095587 | A1 | 4/2021 | Cvelbar et al. | |
| 2021/0285355 | A1 * | 9/2021 | Dimpelfeld | F01N 3/2066 |
| 2022/0316382 | A1 | 10/2022 | De Rudder et al. | |

FOREIGN PATENT DOCUMENTS

FI    20216288 A1    5/2023

* cited by examiner

*Primary Examiner* — Jonathan R Matthias
(74) *Attorney, Agent, or Firm* — Espatent Oy

(57) ABSTRACT

A flow guide and a method therein, including dividing by a divider a mixing chamber to input and output sides; supporting a mixing tube in the mixing chamber, receiving exhaust gas by an intake section from the input side; guiding the received exhaust gas by a swirl guide to flow inside the mixing tube towards the second end as a rotating and advancing main flow; mounting a reactant doser by a reactant doser mount such that when in use, it provides reactant to a dosing section; guiding exhaust gas through the divider by the mixing tube; receiving at least most of the rotating and advancing exhaust gas flow by the dosing section; providing a stem guide around the doser when mounted facing the rotating flow, and defining by the stem guide a central opening surrounding the doser when mounted; and guiding, using a passage structure of the stem guide, a side flow out of the rotating flow to a carrier flow around the doser via the central opening.

18 Claims, 16 Drawing Sheets

Fig. 1F
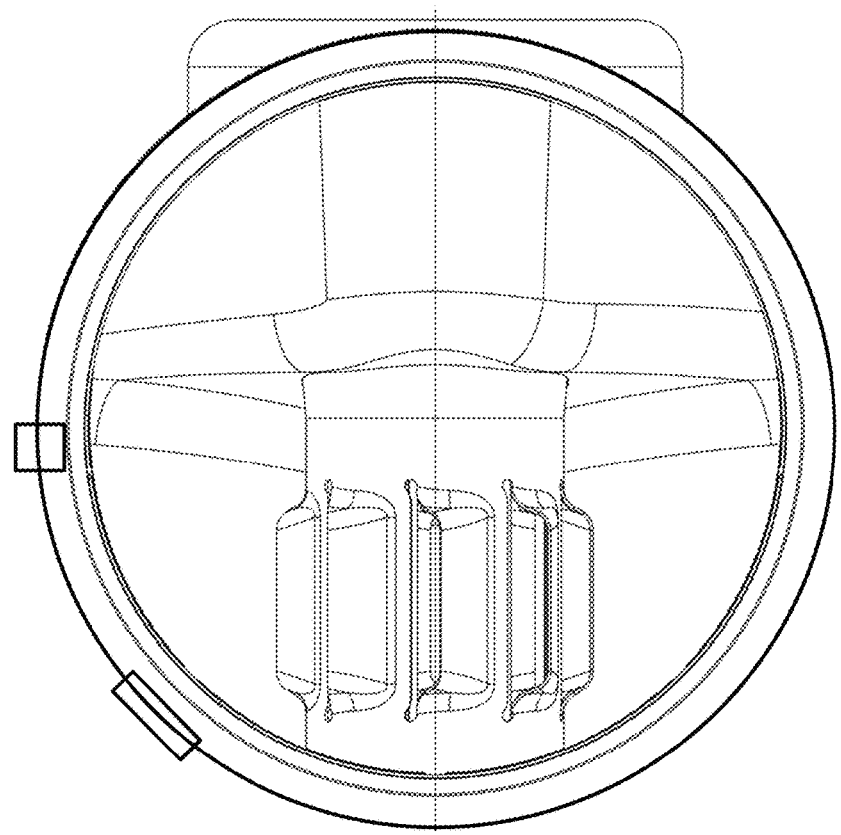
Fig. 1G
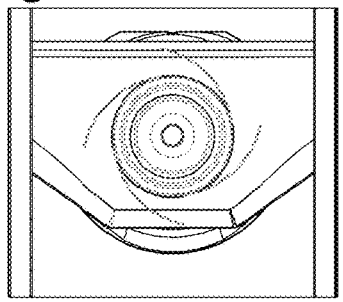
Section I-I
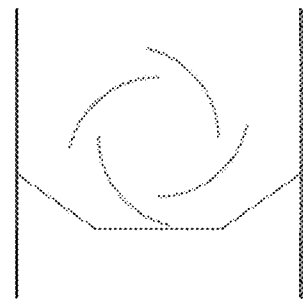
Section J-J
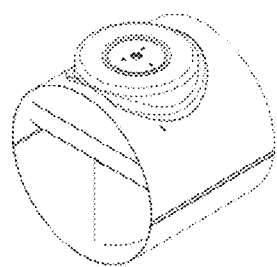
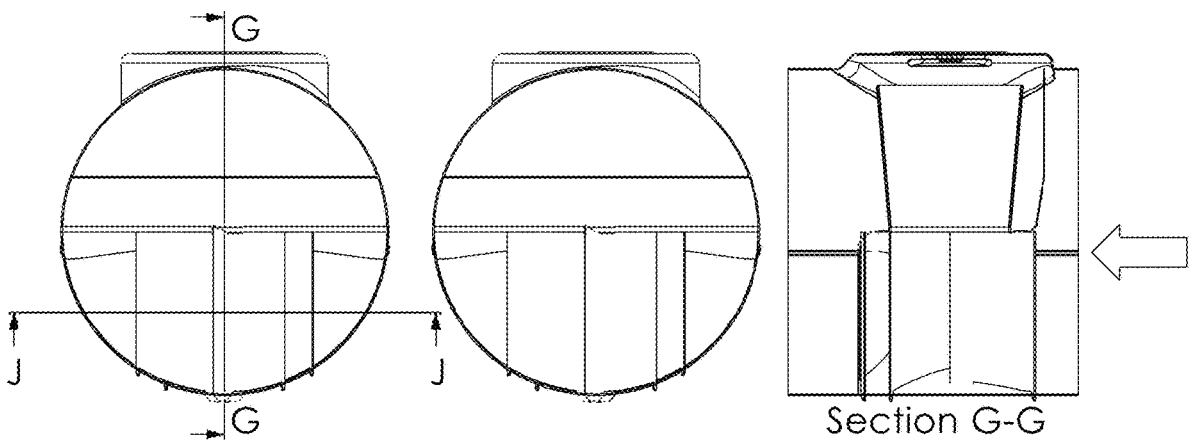
Section G-G

PRESSURE:

LOW
HIGH
P2  P1 > P2  P1

VELOCITY:  HIGH  SLOW

HIGH
SLOW

Fig. 4A 400
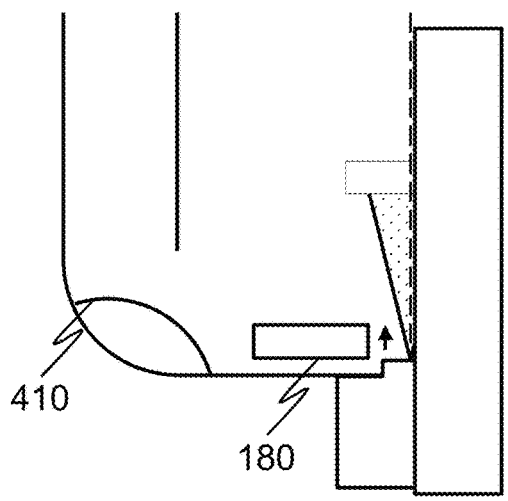
Fig. 4B 400'
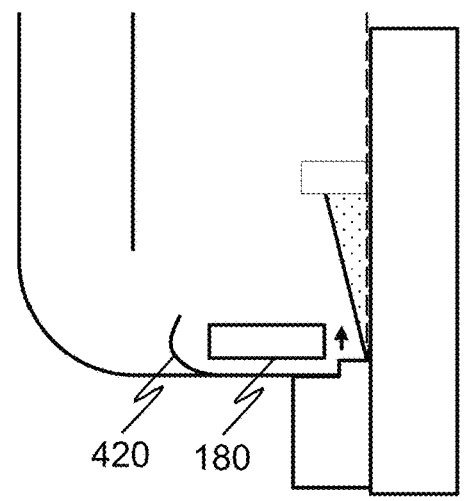
Fig. 5
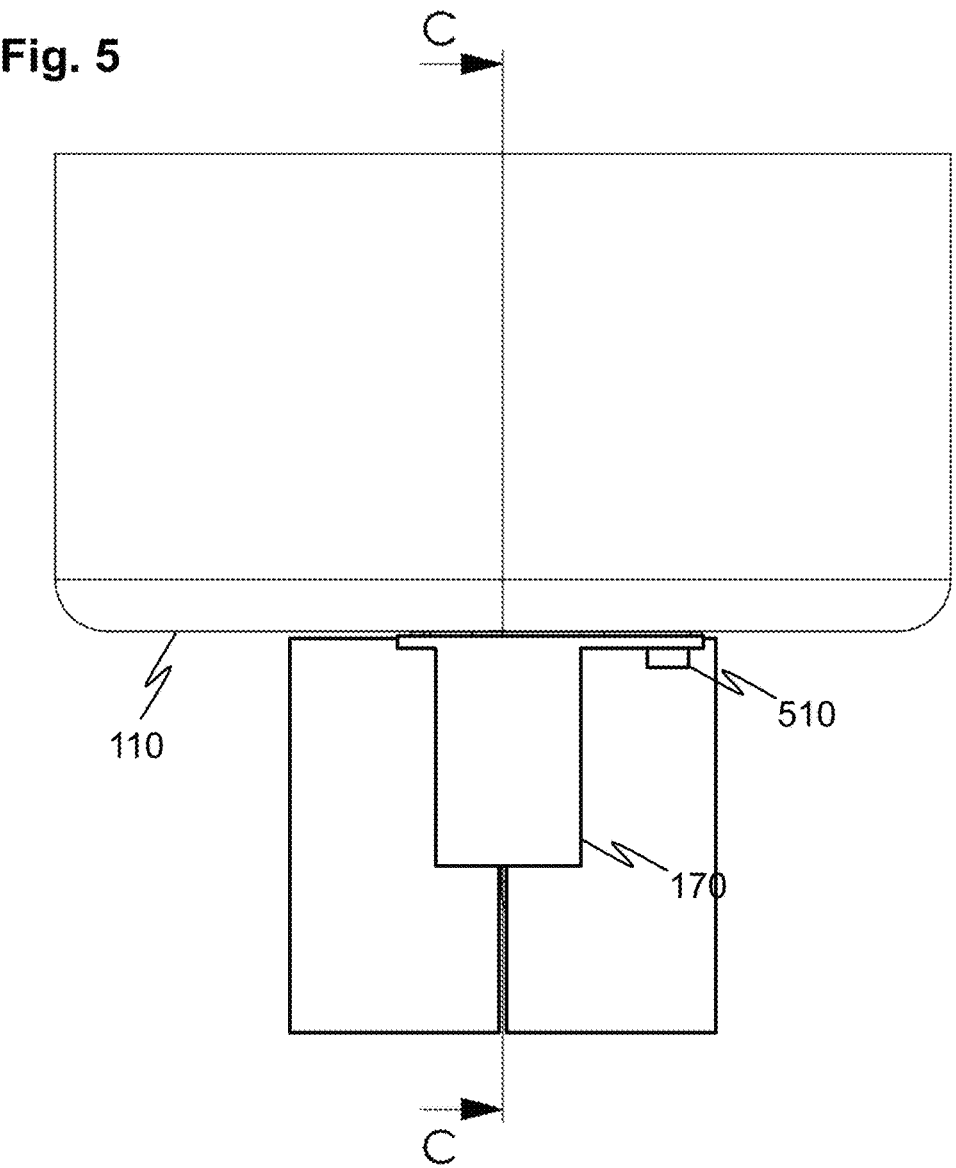

Fig. 8

800: feeding a rotating flow of exhaust gas in a mixing pipe towards a turning end of a mixing chamber 801: dosing reactant by a reactant doser against the rotating flow around a centreline of the mixing pipe 802: maintaining a stem guide around the reactant doser such that a front face of the stem guide faces the rotating flow and the stem guide defines a central opening surrounding the reactant doser 803: forming a pressure difference between a periphery of the stem guide and the mixing chamber around the stem guide 804: guiding a side flow out of the rotating flow to a carrier flow around the reactant doser via the central opening, e.g., using the pressure difference 805: inhibiting by the stem guide turbulence from being transferred from the side flow to the carrier flow 806: forming the pressure difference by a geometry of the mixer 807: forming the pressure difference by throttling the main flow downstream from the stem guide 808: inhibiting the turbulence by guiding the side flow via stem guide channels that feed the side flow by a plurality of radial outputs to the central opening 809: inhibiting the turbulence so that the carrier flow is laminar around the reactant doser

Fig. 11

1100: feeding a rotating flow of the first portion of exhaust gas in the mixing pipe towards a turning end of a mixing chamber 1101: dosing reactant by a reactant doser against the rotating flow around a centreline of the mixing pipe 1102: maintaining a stem guide around the reactant doser such that a front face of the stem guide faces the rotating flow, and the stem guide defines a central opening surrounding the reactant doser 1103: guiding exhaust gas to a carrier flow around the reactant doser via the central opening 1104: upstream from the feeding of the rotating flow of the first portion in the mixing pipe, branching a first portion exhaust gas supply partly to a mixing pipe and a second branch to a carrier flow input 1105: guiding exhaust gas from the carrier flow input to the carrier flow 1106: guiding a side flow out of the rotating flow through the central opening to the carrier flow 1107: inhibiting the turbulence by guiding the side flow via stem guide channels that feed the side flow by a plurality of radial outputs to the central opening.

Fig. 12

1200: defining a mixing chamber comprising an input side and an output side

1201: dividing the mixing chamber by a divider to the input side and the output side 1202: supporting a mixing tube in place inside the mixing chamber, optionally in a perpendicular orientation with relation to the mixing chamber; the mixing tube comprising a first end and a second end, an intake section; and a dosing section between the intake section and the second end 1203: receiving exhaust gas by the intake section from the input side of the mixing chamber 1204: guiding the received exhaust gas by a swirl guide to flow inside the mixing tube towards the second end as a rotating and advancing main flow 1205: mounting a reactant doser by a reactant doser mount such that when in use, the reactant doser provides reactant to the dosing section 1206: guiding exhaust gas through the divider by the mixing tube 1207: receiving at least most of the rotating and advancing exhaust gas flow by the dosing section 1208: dividing some of the main flow into a carrier flow for recirculation and allowing a remainder of the main flow to exit the flow device 1209: inhibiting the turbulence by guiding the side flow via stem guide channels that feed the side flow by a plurality of radial outputs to the central opening

EXHAUST GAS AFTERTREATMENT MIXER

TECHNICAL FIELD

The present disclosure generally relates to an exhaust gas aftertreatment mixer.

BACKGROUND

This section illustrates useful background information without admission of any technique described herein representative of the state of the art.

Exhaust gases may require aftertreatment by use of a suitable reactant. For example, exhaust gas of diesel engines may require aftertreatment to reduce nitrogen oxides in the exhaust gas. To this end, urea suspension is dosed into a stream of exhaust gas as a spray of small droplets. The droplets evaporate and ultimately release gaseous ammonium that reduces nitrogen oxides ($NO_x$) into elementary nitrogen (N) and oxide ($O_2$). There are some practical difficulties in this process, including that a) how to mix the urea suspension so that the reduction of nitrogen oxides takes place to a sufficient extent, b) how to prevent accruing of urea onto exposed surfaces of the aftertreatment equipment, c) how to avoid forming of excess pressure by the aftertreatment equipment, and d) how to fit in the required aftertreatment equipment. These objectives are somewhat contradictory: a greater turbulence tends to improve mixing of the urea solution droplets while inhibiting flow through by increasing pressure. It is easier to reduce pressure and to avoid accrual of urea by using larger chambers and conduits, while compactness of the equipment suffers.

The present invention aims at providing a new alternative to balance between these at least partially conflicting goals. Alternatively, the present invention aims at providing a new technical alternative.

SUMMARY

The appended claims define the scope of protection. Any examples and technical descriptions of apparatuses, products and/or methods in the description and/or drawings not covered by the claims are presented not as embodiments of the invention but as background art or examples useful for understanding the invention.

According to a first example aspect there is provided a flow device for exhaust gas aftertreatment, comprising
a mixing chamber comprising an input side and an output side;
a divider dividing the mixing chamber to the input side and the output side;
a mixing tube comprising a first end and a second end, and an intake section for receiving exhaust gas from the input side of the mixing chamber;
a swirl guide configured to guide the received exhaust gas to flow inside the mixing tube towards the second end as a rotating and advancing main flow; and
a reactant doser mount for a reactant doser; wherein
the mixing tube comprises a dosing section between the intake section and the second end;
the mixing tube extends through the divider;
the dosing section is configured to receive at least most of the rotating and advancing exhaust gas flow; and
the reactant doser mount is configured for mounting the reactant doser such that when in use, the reactant doser provides reactant to the dosing section.

The mixing tube may reside perpendicularly in the mixing chamber. In an alternative, the mixing tube resides at an angle that is 5 to 45 degrees off perpendicular, preferably 10 to 30 degrees.

The divider may be formed of a metal plate. The divider may comprise a mid-section that is perpendicular to the mixing tube. The divider may have a side profile of corresponding to a letter Z with substantially right angles.

The divider may comprise a first guide between the mixing tube and the output side of the mixing chamber.

The divider may comprise a first guide between the mixing tube and the output side of the mixing chamber. The first guide may be concavely shaped when seen from the input side of the mixing chamber, for providing more space on the output side for spreading exhaust gas flow into a next processing phase. The next processing phase may be a selective catalytic reduction (SCR) catalyst. The first guide may contact the mixing tube or the swirl arrangement. The first guide may contact the mixing tube or the swirl arrangement for a length portion of total length of the mixing tube. The length portion may be at least 20%; 30%; or 40%. The length portion may be at most 50%; 60%; or 70%.

The divider may comprise a second guide between the mixing tube and the input side of the mixing chamber. The second guide may be shaped to facilitate flow of exhaust gas towards the intake section. The second guide may have an inclination for facilitating flow of exhaust gas towards intake section.

The first guide may join with a rounded edge to the mid-section. The second guide may join with a rounded edge to the mid-section.

The mixing tube may be cylindrical. The mixing tube may comprise a conical part or the mixing tube may be conical, optionally with an opening angle of at least 1; 2; or 5 degrees, and/or optionally with an opening angle of at most 6; 8; or 10 degrees. In an embodiment, the opening angle is between 5 and 8 degrees or between 2 and 6 degrees. The mixing tube may be conical with a diameter expanding in downstream direction of the main flow. The mixing tube may be conical at the second end.

The mixing tube may reside perpendicularly in the mixing chamber such that a longitudinal axis of the mixing tube is perpendicular to a longitudinal direction of the mixing chamber. The longitudinal direction of the mixing chamber may be defined by a line that connects flow channel centres of the input and output sections.

The mixing tube may be formed of two attached parts, a first part and a second part, for producing a sub-assembly comprising the divider and the mixing tube. The first part may comprise the intake section. The sub-assembly may be attached after assembling to the mixing chamber. Alternatively, at least one part of the sub-assembly may be attached to the sub-assembly after attaching the sub-assembly to the mixing chamber.

The swirl guide may be integrally formed with the intake section of the mixing tube. The swirl guide may comprise one or more wing segments, optionally formed by shaping a portion of a wall of the mixing tube at the intake section to guide exhaust gas into the mixing tube at a generally tangential direction to rotate along an inner surface of the mixing tube. The swirl guide may comprise 3; 4; 5; 6; 7; 8; 9; or 10 wing segments.

The reactant doser mount may be attached to the mixing chamber. The reactant doser mount may be attached to the mixing chamber opposite to the second end of the mixing tube. The reactant doser mount may be attached to the mixing chamber opposite to the second end of the mixing tube aligned so that reactant of a mounted reactant doser is directed along a central axis of the mixing tube. The reactant doser mount may be attached to the mixing chamber opposite to the second end of the mixing tube so that when attached to the reactant doser mount and when in use, the reactant doser injects the reactant into the mixing tube towards the first end. The reactant doser mount may be attached to the mixing chamber opposite to the second end of the mixing tube such that when mounted, the reactant doser extends through the second end. In an alternative, the reactant doser mount is attached to the mixing chamber opposite to the second end of the mixing tube such that when mounted, there is a gap between a tip of the reactant doser and the second end. The reactant doser may be an air-free reactant doser.

The flow device may further comprise a turning end in the mixing chamber for reversing the main flow after exiting the second end of the mixing tube to flow along an outer surface of the mixing tube towards the first end. The main flow may be reversed to flow along the outer surface of the mixing tube towards the first end all around the mixing tube, at least over a sub-section of the length of the mixing tube, such as at least 1 cm; 3 cm; or 5 cm.

The flow device may further comprise a stem guide around the reactant doser when mounted such that a front face of the stem guide faces the rotating flow. The stem guide may define a central opening surrounding the reactant doser when mounted. The stem guide may comprise a passage structure for guiding a side flow out of the main flow to a carrier flow around the reactant doser via the central opening. The passage structure may be configured to inhibit turbulence from being transferred from the side flow to the carrier flow.

The flow device may comprise a geometry configured to form a pressure difference between a periphery of the stem guide and the mixing chamber around the stem guide. The passage structure may be configured to guide the side flow using the pressure difference.

The geometry of the flow device may cause a majority of the main flow to turn around the second end of the mixing tube such that a first portion of the turning flow closer to the stem guide has a lower velocity than a second portion of the turning flow farther apart from the guide, for incurring a higher pressure in the first portion than a pressure in the central opening.

The pressure difference may be formed by throttling the main flow downstream from of the guide.

The inhibiting of the turbulence may be performed by guiding the side flow via stem guide channels feeding the side flow by a plurality of radial outputs to the central opening. The inhibiting of turbulence may make the carrier flow laminar around the reactant doser when mounted.

The stem guide channels may be defined by a plurality of wings that are radially extending from the central opening. The wings may have back-side fairings configured to reduce turbulence. The wings may have planar front-sides. The front-sides may be directed against rotation of the rotating flow. The front-sides may be at an angle with relation to a radial direction such that front-side is turned at a peripheral end towards incoming gas flow.

All or at least some of the wings may extend to a periphery of the stem guide. All or at least some of the wings may be inset from the periphery of the stem guide. All or at least some of the wings may be inset from the periphery of the stem guide by at least 1%; 2%; 5%; 10%; or 20% of local radius. All or at least some of the wings may be inset from the periphery of the stem guide by at most 2%; 5%; 10%; 20%, or 30% of local radius. The local radius may refer to a distance from a given point of the periphery of the stem guide to a centre of the stem guide when seen in an axial direction of the mixing tube.

All or at least some of the wings may extend to the central opening. All or at least some of the wings may be inset from the central opening. The inset from the central opening may be at least 1%; 2%; 5%; 10%; or 20% of local radius. The inset from the central opening may be at most 2%; 5%; 10%; 20%, or 30% of local radius.

All or at least some of the wings may define fixing holes. The fixing holes may be pitched for bolts. One or more of the wings that accommodate fixing holes may be expanded to accommodate respective fixing holes. The fixing holes may reside rotation symmetrically. Alternatively, the fixing holes may reside rotation asymmetrically. The fixing holes may reside at constant distance from the central opening. Alternatively, all, or at least some of the fixing holes may reside at different distances from the central opening.

The fixing holes may be configured to enable mounting of the reactant doser. The reactant doser may be mounted by bolts such that the turning end of the mixing chamber is compressed between the reactant doser and the stem guide. The compressing may be performed with bolts tightened through a base of the reactant doser and through the turning end to the fixing holes. Alternatively, the stem guide may comprise threaded rods instead of all or at least some of the fixing holes. The threaded rods may be directed towards and through the turning end and the base of the reactant doser. All or at least some of the threaded rods may be integrally formed with the stem guide. All or at least some of the threaded rods may be machined to cast protrusions in the stem guide. All or at least some of the threaded rods may be welded to the stem guide. All or at least some of the threaded rods may be screwed to threads in the fixing holes.

The stem guide may define a disc. The disc may be separated by the wings from the turning end of the mixing chamber. The disc may be supported by the wings. The disc may define the stem guide channels on one side. The turning end may define the stem guide channels on another side.

The front face of the stem guide may be concave. Alternatively, the front face may be planar. Further alternatively, the front face may have a planar portion and a concave portion. The planar portion may reside between the central opening and the concave portion.

The mixing chamber may comprise cylindrical part around the second end of the mixing tube. The mixing tube may be coaxial with the cylindrical part of the mixing chamber. The reactant doser may be configured to dose the reactant coaxially with the mixing tube. The central opening may reside coaxially with the mixing tube. The disc may reside coaxially with the mixing tube.

The central opening may comprise a cylindrical portion. The central opening may comprise a conical portion. The central opening may have a rounded edge on an input side. The central opening may have a rounded edge on an output side.

The central opening may reside at a centre of the disc. Alternatively, the central opening may reside with an offset from the centre of the disc. The central opening may be displaced from the centre of the disc to compensate uneven pressure distribution around the disc.

The disc may have a circular periphery. Alternatively, the disc may have a varying radius. The radius of the disc may vary to compensate uneven pressure distribution around the disc.

The turning end of the mixing chamber may have a planar central section. The planar central section may join to a peripheral wall of the mixing chamber by an intermediate portion. The intermediate portion may be concave. The intermediate portion may extend over a portion of a radius of the peripheral wall when measured at the tip of the reactant doser. The portion of the radius may be at least 1%; 2%; 5%; or 10%. The portion of the radius may be at most 2%; 5%; 10%; or 20%. The portion may have a constant radius.

The second end of the mixing tube may reside at an axial distance from the turning end and at a radial distance from the peripheral wall. The axial distance may be at least 50%; 70%; 80%; 90%; 100%; or 110% of the radial distance. The axial distance may be at most 80%; 90%; 100%; 110%; or 150% of the radial distance.

The throttling may result in a flow passage having a cross-sectional surface area at most 90%; 80%, 60%, 50%, or 30% of a cross-sectional surface area of the mixing tube at the second end.

Some exhaust gas may be fed through an internal bypass to an output side of the mixing chamber for reducing counter pressure. The internal bypass may be formed on the divider. The internal bypass may be formed to face the dosing section such that exhaust gas bypassing through the internal bypass becomes guided by an external surface of the dosing section. The internal bypass may reside on a mixing tube output side half of the mixing chamber. The internal bypass may be or comprise a perforation. The internal bypass may be or comprise a grill. The internal bypass may be or comprise an aperture.

The internal bypass may be configured to allow a bypass portion of the exhaust gas flow through the internal bypass. The bypass portion may be at least 1 weight percent. The bypass portion may be at least 2 weight percent. The bypass portion may be at least 5 weight percent. The bypass portion may be at least 10 weight percent. The bypass portion may be at least 20 weight percent. The bypass portion may be at least 30 weight percent. The bypass portion may be at most 2 weight percent. The bypass portion may be at most 5 weight percent. The bypass portion may be at most 10 weight percent. The bypass portion may be at most 20 weight percent. The bypass portion may be at most 30 weight percent. The bypass portion may be at most 40 weight percent.

The internal bypass may be configured to direct the bypass portion to bypass the mixing tube. The internal bypass may be configured to direct the bypass portion to bypass swirl-inducing flow guide elements. The internal bypass may be configured to direct the bypass portion to join a feed of the stem guide.

The flow device may comprise a diffuser downstream from the mixing chamber. The diffuser may comprise an outwards opening conical section configured to reduce pressure of the exhaust gas at a central region of the diffuser. The diffuser may comprise a diffusing guide, e.g., a parallel guide adjacent to the mixing tube. The diffusing guide may have an elliptical or parabolic cross-section.

The flow device may be a mixer for mixing reactant with exhaust gas.

According to a second example aspect there is provided a method comprising:
defining a mixing chamber comprising an input side and an output side;
dividing the mixing chamber by a divider to the input side and the output side;
supporting a mixing tube in place inside the mixing chamber, optionally in a perpendicular orientation with relation to the mixing chamber;
the mixing tube comprising a first end and a second end, an intake section; and a dosing section between the intake section and the second end;
receiving exhaust gas by the intake section from the input side of the mixing chamber;
guiding the received exhaust gas by a swirl guide to flow inside the mixing tube towards the second end as a rotating and advancing main flow;
mounting a reactant doser by a reactant doser mount such that when in use, the reactant doser provides reactant to the dosing section;
guiding exhaust gas through the divider by the mixing tube; and
receiving at least most of the rotating and advancing exhaust gas flow by the dosing section.

In an alternative of the second example aspect, the method comprises dividing by a divider a mixing chamber to an input side and an output side; supporting a mixing tube in the mixing chamber, receiving exhaust gas by an intake section from the input side of the mixing chamber; guiding the received exhaust gas by a swirl guide to flow inside the mixing tube towards the second end as a rotating and advancing main flow; optionally mounting a reactant doser by a reactant doser mount such that when in use, the reactant doser provides reactant to the dosing section; guiding exhaust gas through the divider by the mixing tube; and receiving at least most of the rotating and advancing exhaust gas flow by the dosing section.

According to a third example aspect there is provided a method in a mixer, comprising
feeding a rotating flow of exhaust gas in a mixing tube towards a turning end of a mixing chamber;
dosing reactant by a reactant doser against the rotating flow around a centreline of the mixing tube;
maintaining a stem guide around the reactant doser such that a front face of the stem guide faces the rotating flow, and the stem guide defines a central opening surrounding the reactant doser; and
guiding a side flow out of the rotating flow to a carrier flow around the reactant doser via the central opening.

The method may further comprise inhibiting by the stem guide turbulence from being transferred from the side flow to the carrier flow.

The method may further comprise forming a pressure difference between a periphery of the stem guide and the mixing chamber around the stem guide.

The side flow may be guided out of the rotating flow using the pressure difference to the carrier flow around the reactant doser via the central opening.

According to a fourth example aspect there is provided a mixer for exhaust gas aftertreatment, comprising
a feed configured to feed a rotating flow of exhaust gas in a mixing tube towards a turning end of a mixing chamber;
a reactant doser mount for mounting a reactant doser such that when mounted and in use, the reactant doser doses reactant against the rotating flow around a centreline of the mixing tube; and
a stem guide around the reactant doser mount such that a front face of the stem guide faces the rotating flow, and the stem guide defines a central opening surrounding the reactant doser;

the stem guide comprising a passage structure for guiding a side flow out of the rotating flow using the pressure difference to a carrier flow around the reactant doser via the central opening.

The passage structure may be configured to inhibit turbulence from being transferred from the side flow to the carrier flow.

The mixer may further comprise the reactant doser.

The mixer may further comprise a pressure structure configured to form a pressure difference between a periphery of the stem guide and the mixing chamber around the stem guide.

The passage structure may be configured to guide the side flow out of the rotating flow using the pressure difference to a carrier flow around the reactant doser via the central opening.

According to a fifth example aspect there is provided an exhaust gas treatment system. The system may comprise the flow device or the mixer of any example aspect. The system may comprise a diesel oxidation catalysts, DOC. The system may comprise a diesel particulate filters, DPF. The system may comprise a selective catalytic reduction, SCR, catalyst. The system may comprise the reactant doser.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which:

FIGS. 1B to 1L show views of different flow guides of various example embodiments;

FIG. 4A shows an arrangement for causing a pressure differential that produces a carrier flow around a reactant doser, according to an example embodiment;

FIG. 4B shows an arrangement for splitting a side flow for producing a carrier flow around a reactant doser, according to an example embodiment;

FIG. 5 shows a view of a reactant doser when mounted to the mixer, according to an example embodiment;

FIG. 8 shows a flow chart according to an example embodiment;

FIG. 1l shows a flow chart of a method in a mixer according to an example embodiment;

FIG. 12 shows a flow chart of a method in a mixer according to an example embodiment.

DETAILED DESCRIPTION

In the following description, like reference signs denote like elements or steps.

Figure 1A:
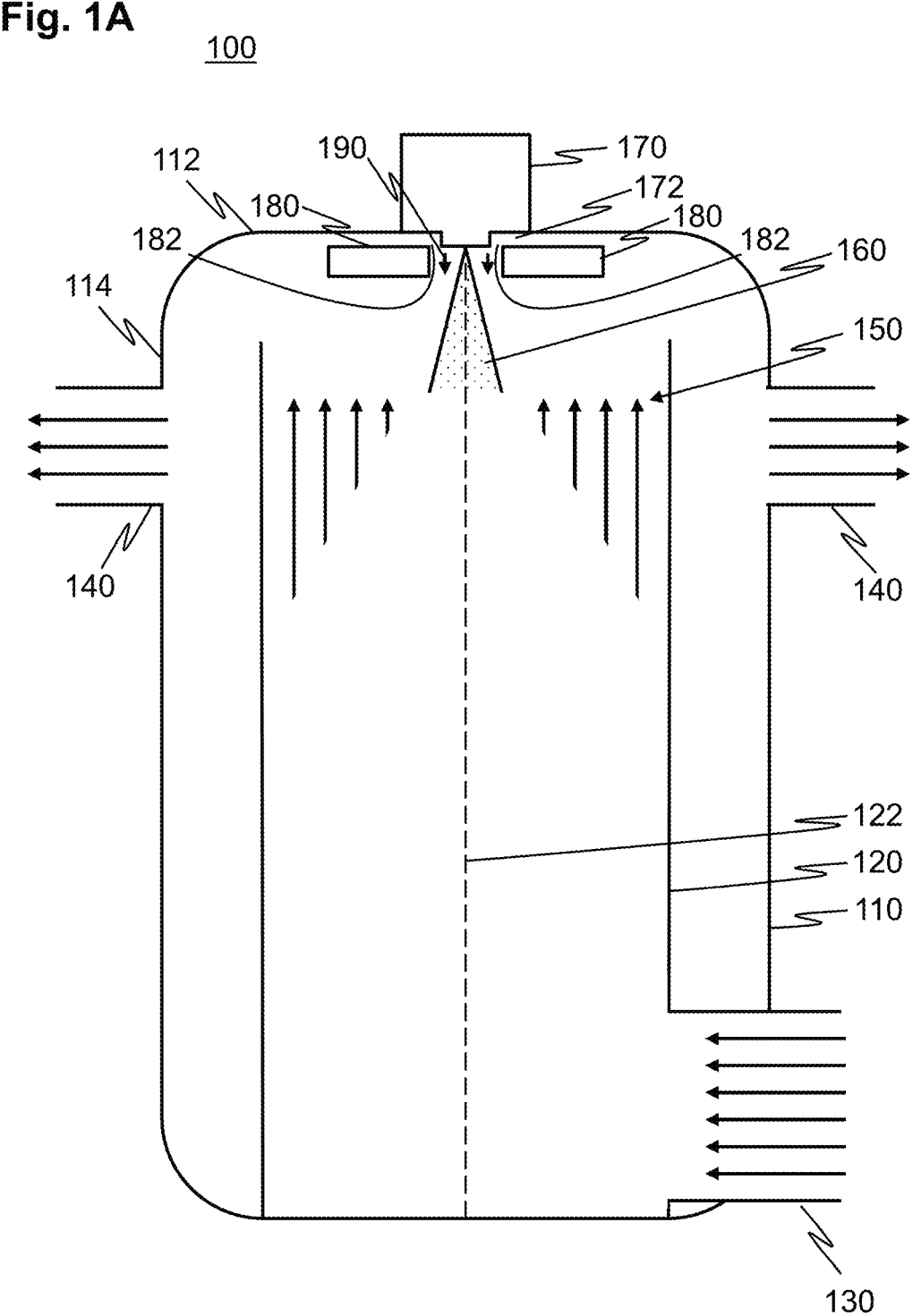
FIG. 1A schematically shows simplified sectional drawing of an exhaust gas mixer for aftertreatment, according to an example embodiment.

FIG. 1A schematically shows an exhaust gas mixer 100 for aftertreatment, according to an example embodiment. FIG. 1A represents a generalisation for explaining various example embodiments. FIGS. 1B to 1L illustrate various alternative embodiments of a flow device that may operate employing at least some of the example embodiments of the exhaust gas mixer. Moreover, these drawings illustrate various further example embodiments.

The mixer comprises a mixing chamber 110 that houses a mixing tube 120. The mixer further comprises an input 130 and an output 140, here formed of two outlets. The input 130 is implemented in FIG. 1A by a conduit leading exhaust gas tangentially to the mixing tube 120 so forming a rotating main flow 150 into the mixing tube 120. The rotating main flow advances towards a turning end 112 of the mixing chamber 110. The mixing chamber of FIG. 1A is cylindrical and so the mixing chamber has a peripheral wall 114 that is cylindrical. In another example embodiment, the mixing chamber has a different shape, such as an oval or elliptic shape.

In an example embodiment, the rotation of the main flow 150 is produced by other swirl structures instead of or in addition to the swirl producing input 130 that is used in this embodiment, such as a propeller formed swirl guide (not shown).

The rotation of the main flow 150 centrifugally packs the main flow against an inner wall of the mixing tube 120. A lower pressure prevails around a centreline 122 of the mixing tube. This effect is made used to enhance dosing reactant 160 by a reactant doser 170 from a reactant doser tip 172 against the main flow around the centreline 122, with greatly reduced counterflow against the reactant doser. However, it is typical that some accrual of reactant begins to build up on the reactant doser 170 possibly because of turbulences and/or imperfect dosing at start and end of the dosing of reactant. To this end, a carrier flow 190 is formed using a stem guide 180 positioned around the reactant doser 170, through a central opening 182 defined by the stem guide around the reactant doser 170. Here, around refers to that the stem guide extends radially from the reactant doser 170 on a portion of the length of the reactant doser 170 in the mixing chamber 110, not that the stem guide 180 should enclose the entire reactant doser 170.

The carrier flow is produced in an example embodiment by forming a pressure difference in the mixing chamber around the stem guide 180, as further described referring to FIGS. 3 and 4.

FIG. 1A shows only schematically one example embodiment. Various details can be freely modified. In FIG. 1A, arrows roughly illustrate mass flow.

The reactant doser 170 of FIG. 1A is an air-free reactant doser. Thus, the reactant doser 170 outputs the reactant without using air as a carrier. In an alternative embodiment, the reactant doser 170 uses a carrier gas to dose the reactant.

As seen from FIG. 1A, by positioning the reactant doser 170 at or close the turning end of the mixing chamber, the space in front of the turning end can be used for dosing the reactant and feeding into a core of the main flow. By arranging the reactant doser 170 further away from mixing tube, the reactant may effectively gain a greater space and time to dissolve and evaporate before being turned back by the rotating and advancing main flow. Or, with the same space and time, the mixing chamber may be made more compact.

Figure 1B:
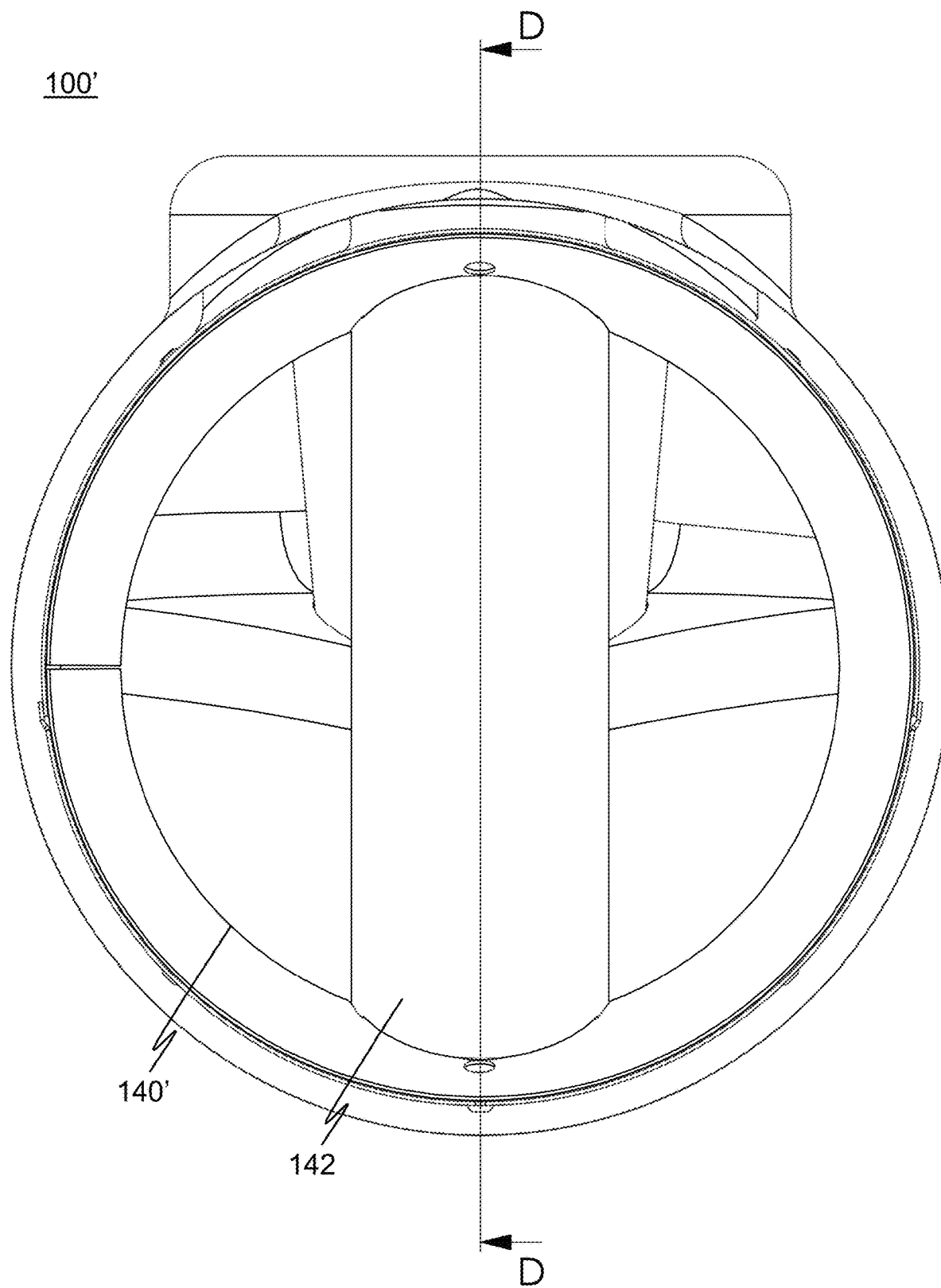

FIG. 1B shows a flow device 100' of an example embodiment for exhaust gas aftertreatment, comprising a mixing chamber 110' comprising an input side 110a and an output side 110b;

a divider 115a dividing the mixing chamber 110' to the input side 110a and the output side 110b;

a mixing tube 120' comprising a first end and a second end, and an intake section 120a for receiving exhaust gas from the input side 110a of the mixing chamber;

a swirl guide 132 configured to guide the received exhaust gas to flow inside the mixing tube 120' towards the second end as a rotating and advancing main flow 150 (FIGS. 1A; 1D); and a reactant doser mount 172 for a reactant doser 170; wherein the mixing tube 120' comprises a dosing section 120b between the intake section 120a and the second end;

the mixing tube 120' extends through the divider 115a;

the dosing section 120b is configured to receive at least most of the rotating and advancing exhaust gas flow; and a reactant doser mount 172 is configured for mounting the reactant doser 170 such that when in use, the reactant doser provides reactant to the dosing section.

In an example embodiment, the mixing tube 120' resides perpendicularly or substantially perpendicularly in the mixing chamber 120'. In an embodiment, the mixing tube resides at an angle that is 5 to 45 degrees off perpendicular, preferably 10 to 30 degrees. The perpendicular orientation may advantageously contribute to compactness of the flow device such that pressure loss is balanced with mixing efficiency. In the perpendicular orientation, the mixing tube basically occupies a length of the mixing chamber only corresponding to the width of the mixing tube. Moreover, when the swirl arrangement 132 employs tangential feeding of exhaust gas into the mixing tube, the intake section 120a need not change much the flow direction of the exhaust gas, so helping to avoid increasing pressure loss over the flow guide. A tangential swirl arrangement may thus operate synergically with the perpendicular or substantially perpendicular mixing tube. Different tangential swirl arrangements are further shown in FIGS. 1F to 1J. In an alternative embodiment, a non-tangential swirl arrangement is used, such as a propeller inside the mixing tube (not shown).

In an example embodiment, the divider 115a is formed of a metal plate. In an example embodiment, the divider comprises a mid-section 117 that is perpendicular to the mixing tube, see e.g., FIGS. 1B and 1E. The mid-section 117 provides a side profile of generally corresponding to a letter Z with substantially right angles.

FIG. 1B further shows a diffusing guide 142. The diffusing guide is here elongated and in parallel with the mixing tube. The diffusing guide 142 is configured to split exhaust gas otherwise mostly focusing on the centre line of the mixing tube so that the exiting exhaust gas would be more diffuse or evenly spread. The diffusing guide 142 here has an outwards convex shape and concave towards the mixing tube.

Figure 1C:
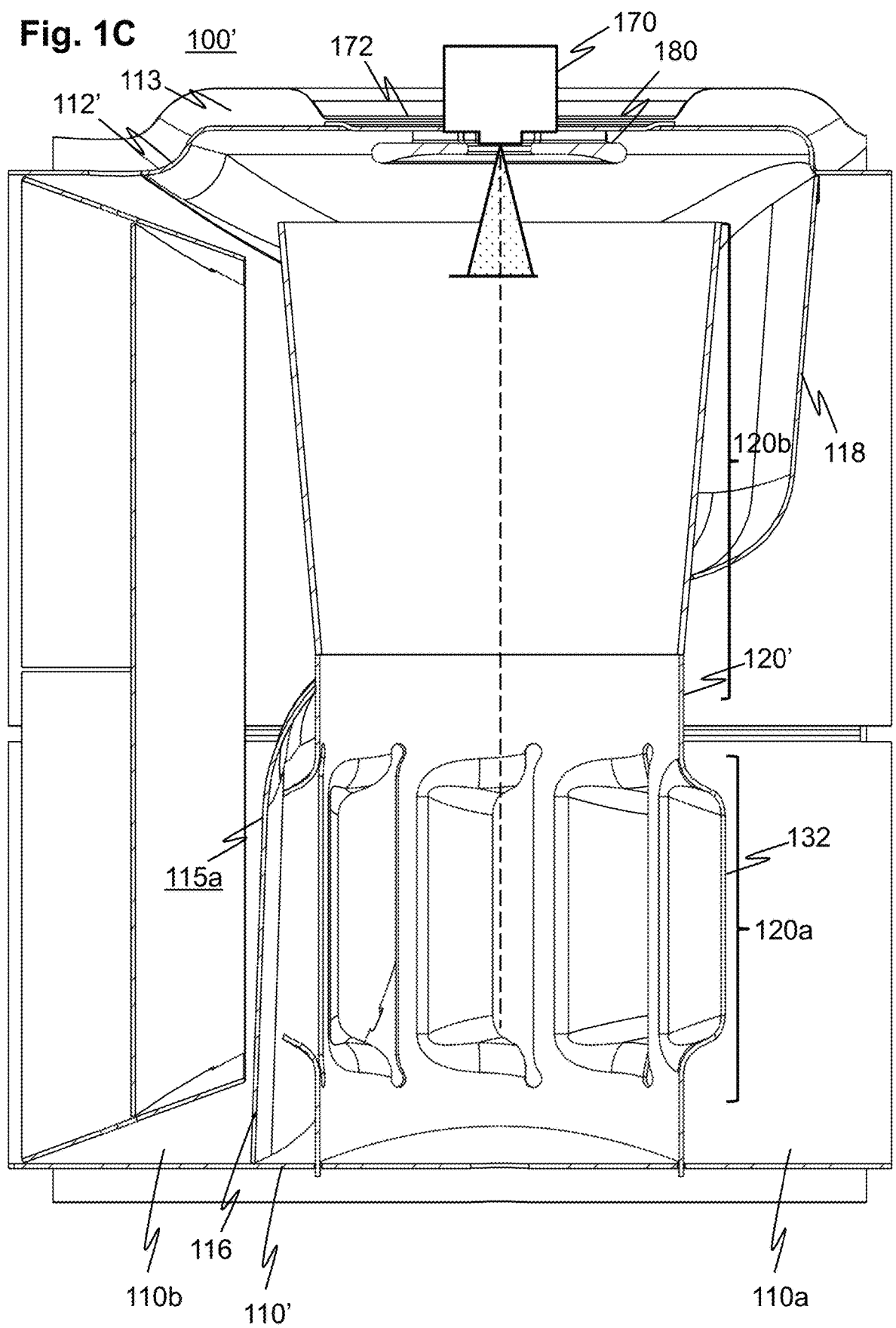

FIG. 1C shows a line D-D along which FIG. 1C is sectioned.

Figure 1D:
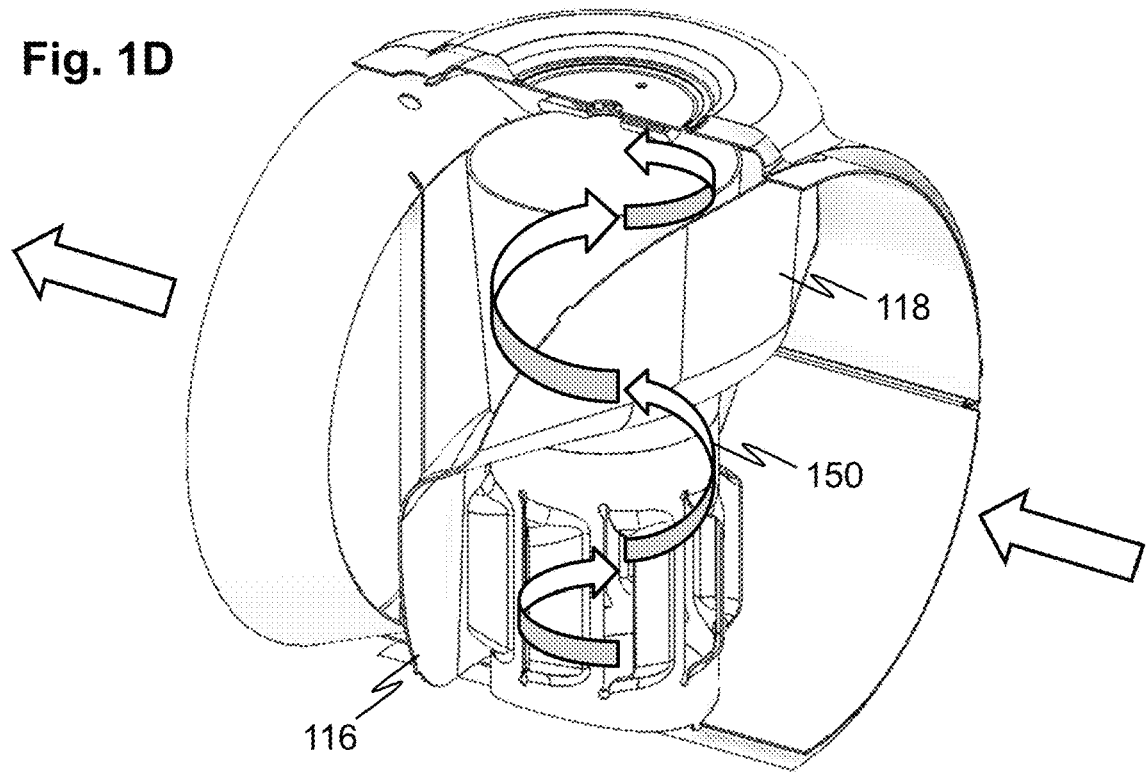
Figure 1E:
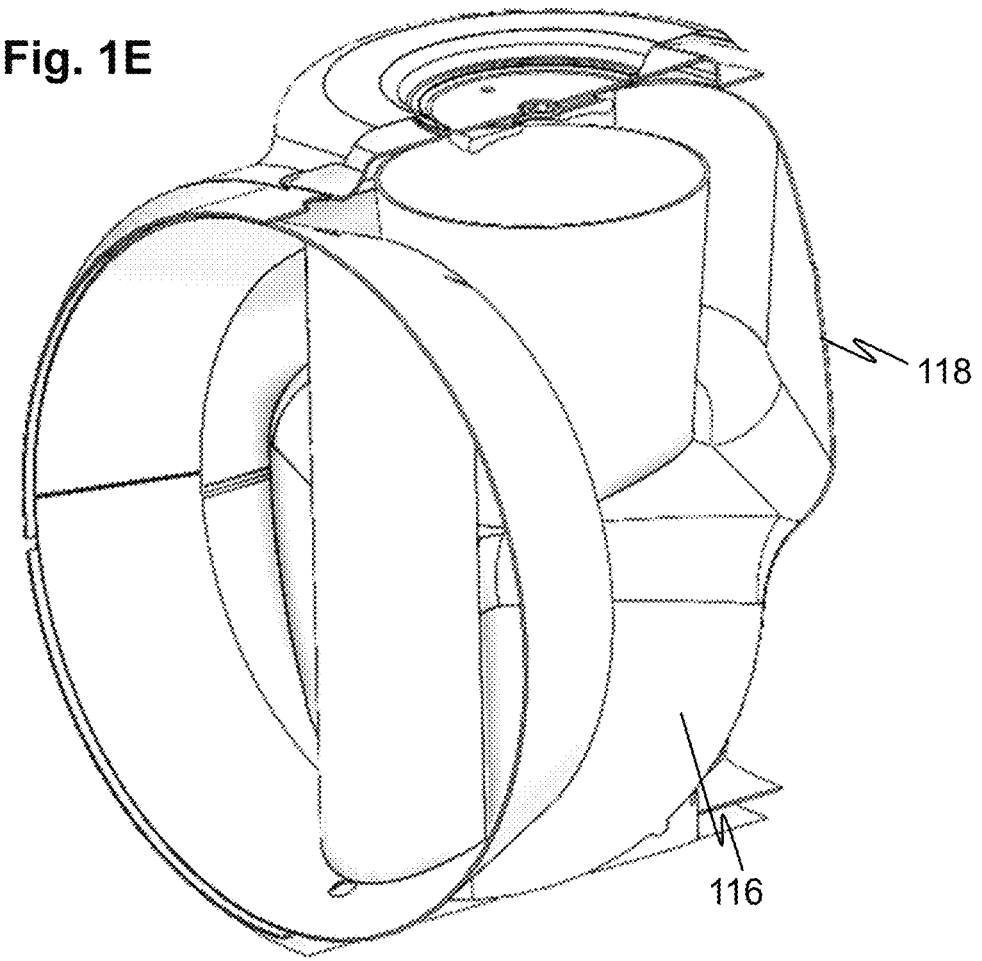

In FIGS. 1D and 1E, it is seen how the divider 115a may form a first guide 116 between the mixing tube and the output side of the mixing chamber and a second guide 118 between the mixing tube and the input side of the mixing chamber. These first and second guides 116, 118 may separate the input and output sides and guide exhaust gas to enter the mixing tube 120' and be passed to a next process phase with a flattened velocity profile across a downstream end of the mixing chamber 110'. By flattening the velocity profile, subsequent processing, such as catalytic reduction of nitrogen oxides, may be improved and/or subsequent pressure loss be reduced in the exhaust gas flow.

In an example embodiment, the first guide 116 is concavely shaped when seen from the input side of the mixing chamber, for providing more space on the output side for spreading exhaust gas flow into a next processing phase. See particularly FIG. 1E that shows the output side with increased space thanks to the concave or V-shaped input side of the mixing chamber as defined by the concave divider 115a.

In an example embodiment, the first guide 116 contacts the mixing tube 120' or the swirl arrangement 132. FIG. 1B shows that a portion of the swirl arrangement 132 contacts with the first guide 116 or comes very close thereto. This may both save space and further enhance operation of the swirl arrangement 132.

In an example embodiment, the first guide 116 contacts the mixing tube 120' or the swirl arrangement 132 for a length portion of total length of the mixing tube. In an example embodiment, the length portion is at least 20%; 30%; or 40%. In an example embodiment, the length portion is at most 50%; 60%; or 70%.

In an example embodiment, the second guide 118 is shaped to facilitate flow of exhaust gas towards the intake section, see particularly FIG. 1E showing the output side. The input side of the second guide 118 is V-shaped so that exhaust gas is guided towards the mixing tube. In an example embodiment, the second guide 118 further has an extent of curving so as to further facilitate bringing the exhaust gas into the mixing tube 120' with reduced turbulence and pressure loss prior to entering the mixing tube 120'. In an example embodiment, the second guide 118 has an inclination (see FIG. 1B) for facilitating flow of exhaust gas towards intake section 120a.

In an example embodiment, the first guide 116 joins with a rounded edge to the mid-section 117. The second guide 118 may join with a rounded edge to the mid-section 117.

In an example embodiment, the mixing tube 120' is cylindrical or comprises a conical part, optionally with an opening angle of at least 1; 2; or 5 degrees, and/or optionally with an opening angle of at most 6; 8; or 10 degrees. In an embodiment, the opening angle is between 5 and 8 degrees or between 2 and 6 degrees. In an example embodiment, the mixing 120' the conical part has a diameter expanding in downstream direction of the main flow. In an example embodiment, the mixing tube 120' is conical or has a conical part at the second end.

In an example embodiment, the mixing tube 120' resides perpendicularly in the mixing chamber 110' such that a longitudinal axis of the mixing tube 120' is perpendicular to a longitudinal direction of the mixing chamber 110', see particularly FIG. 1C. The longitudinal direction of the mixing chamber 110' may be defined by a line that connects flow channel centres of the input and output sections.

In an example embodiment, the mixing tube is formed of two attached parts, a first part and a second part, for producing a sub-assembly comprising the divider and the mixing tube. Such a structure may help assembling of the flow guide. In an example embodiment, the first part comprises the intake section 120*a*. In an example embodiment, the sub-assembly is attached after assembling to the mixing chamber 110'. In an example embodiment, at least one part of the sub-assembly is attached to the sub-assembly after attaching the sub-assembly to the mixing chamber 110'.

In an example embodiment, the swirl guide 132 is integrally formed with the intake section 120*a* of the mixing tube 120'. In an example embodiment, the swirl guide 132 comprises one or more wing segments, optionally formed by shaping a portion of a wall of the mixing tube 120' at the intake section to guide exhaust gas into the mixing tube 120' at a generally tangential direction to rotate along an inner surface of the mixing tube. In an example embodiment, the swirl guide comprises 3; 4; 5; 6; 7; 8; 9; or 10 wing segments.

In an example embodiment, the reactant doser mount 172 is attached to the mixing chamber 110'. In an example embodiment, the reactant doser mount 172 is attached to the mixing chamber 110' opposite to the second end of the mixing tube 120'. In an example embodiment, the reactant doser mount 172 is attached to the mixing chamber opposite to the second end of the mixing tube 120' aligned so that reactant of a mounted reactant doser 170 is directed along a central axis of the mixing tube 120'. In an example embodiment, the reactant doser mount is attached to the mixing chamber 110' opposite to the second end of the mixing tube 120' so that when attached to the reactant doser mount 172 and when in use, the reactant doser 170 injects the reactant into the mixing tube towards the first end, e.g., as shown in FIG. 1C. In an example embodiment, the reactant doser mount 172 is attached to the mixing chamber 110' opposite to the second end of the mixing tube 120' such that when mounted, the reactant doser 170 extends through the second end. In an alternative, the reactant doser 170 mount is attached to the mixing chamber 110' opposite to the second end of the mixing tube 120' such that when mounted, there is a gap between a tip of the reactant doser 170 and the second end. In an example embodiment, the reactant doser 170 is an air-free reactant doser.

In an example embodiment, the flow device further comprises a turning end in the mixing chamber 110' for reversing the main flow after exiting the second end of the mixing tube 120 to flow along an outer surface of the mixing tube 120' towards the first end. See, e.g., FIG. 1C that shows an asymmetric cup shaped form 112' that helps to turn the main flow backwards along outer surfaces of the mixing tube 120' and also partially towards the centre of the turning end under towards the doser 170, for forming the carrier flow 190 shown in FIG. 1A.

In FIG. 1B, the asymmetric cup shaped form 112' and an outer wall define an insulation space 113 for insulating the flow guide at the turning end. This helps to accelerate warming up of the flow guide for dosing the reactant. It is also possible to use otherwise the insulation space 113. For example, in an example embodiment, some of that space is used to guide some of the exhaust gas from the input side to a carrier flow for the reactant, see particularly FIGS. 1K and 1L. There, one or more channels are formed to direct a portion of the exhaust gas from the input side of the mixing chamber to the carrier flow. In an example embodiment, there is provided a partial bypass of the divider 115*a* for reducing counter pressure caused by the exhaust gas mixer 100, as will be described subsequently with further detail with reference to FIG. 13.

FIG. 1G shows different views of an embodiment with four arcuate, preferably continuously arcuate, wing segments, or blades. The blades can be fixed to a mixing tube to feed exhaust gas through openings in the mixing tube. Alternatively, the mixing tube may join an edge of the blades such that the blades form a rotating and advancing exhaust gas flow already before the exhaust gas enters the mixing tube.

Figure 1H:
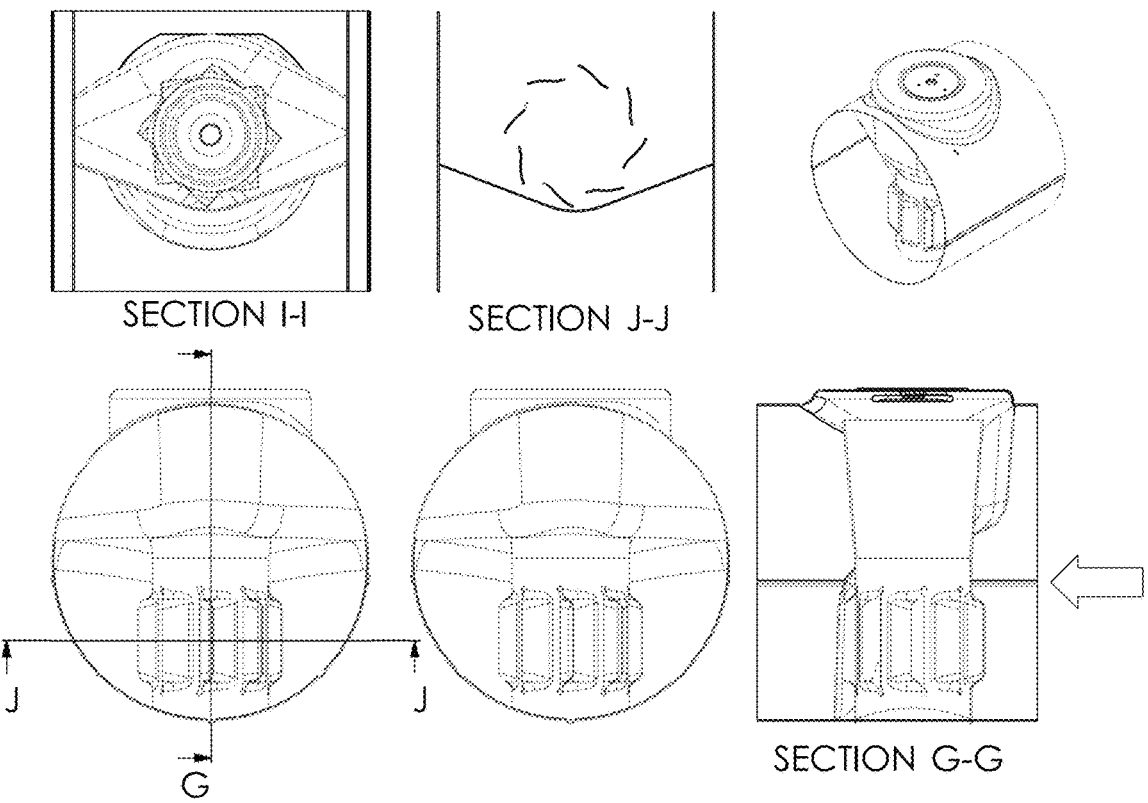
Figure 1I:
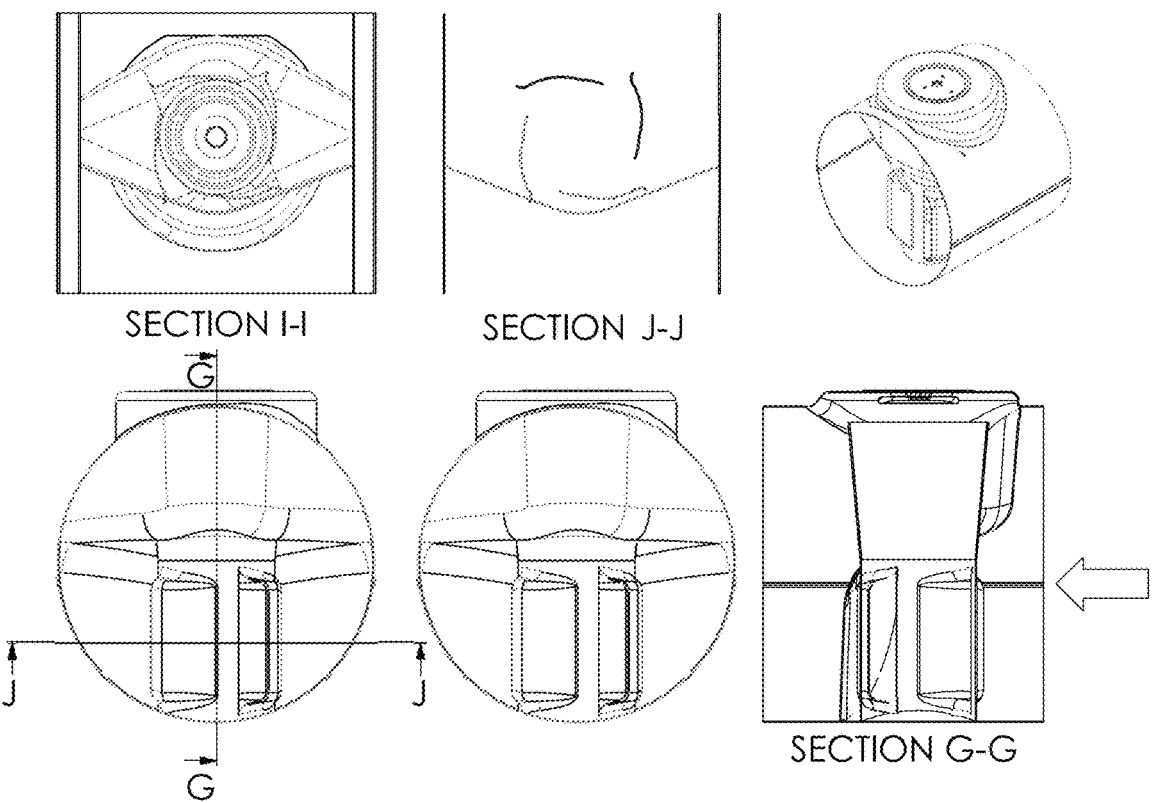

FIG. 1H shows different views of an embodiment with eight wing segments.

Figure 1J:
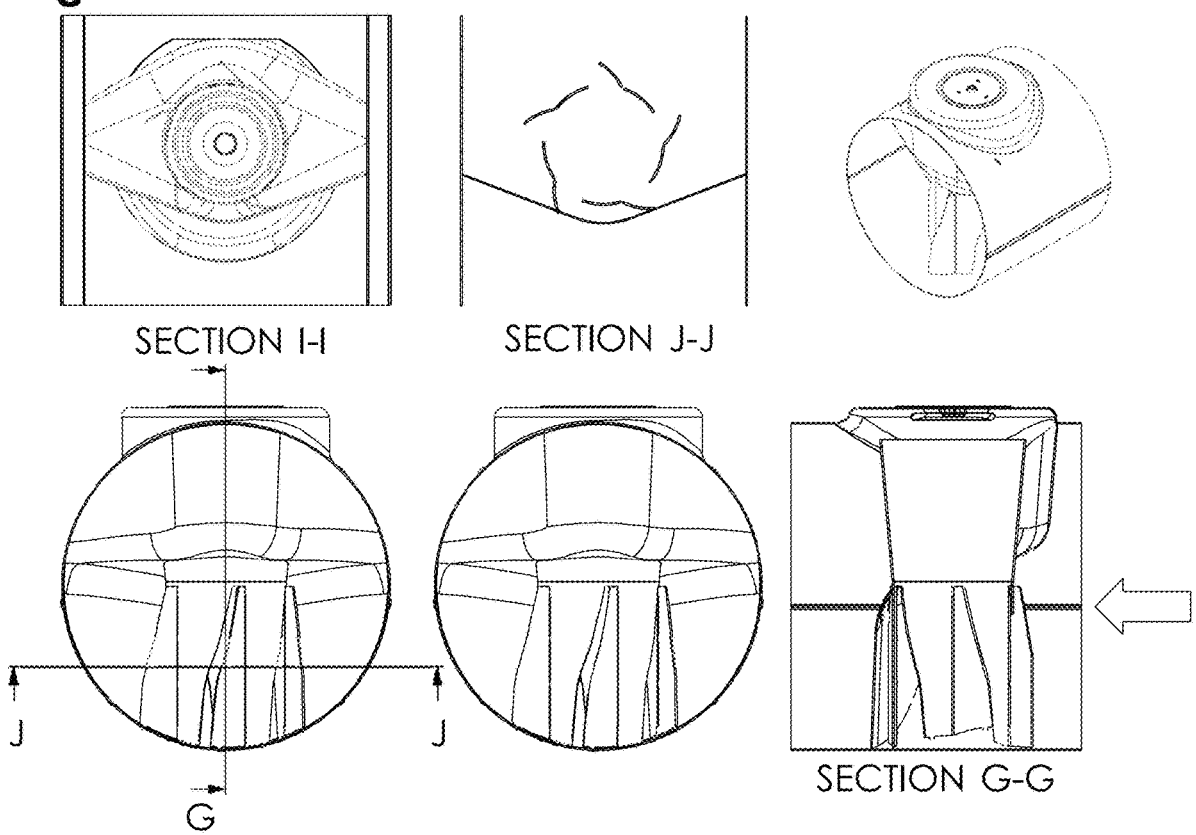
Figure 1K:
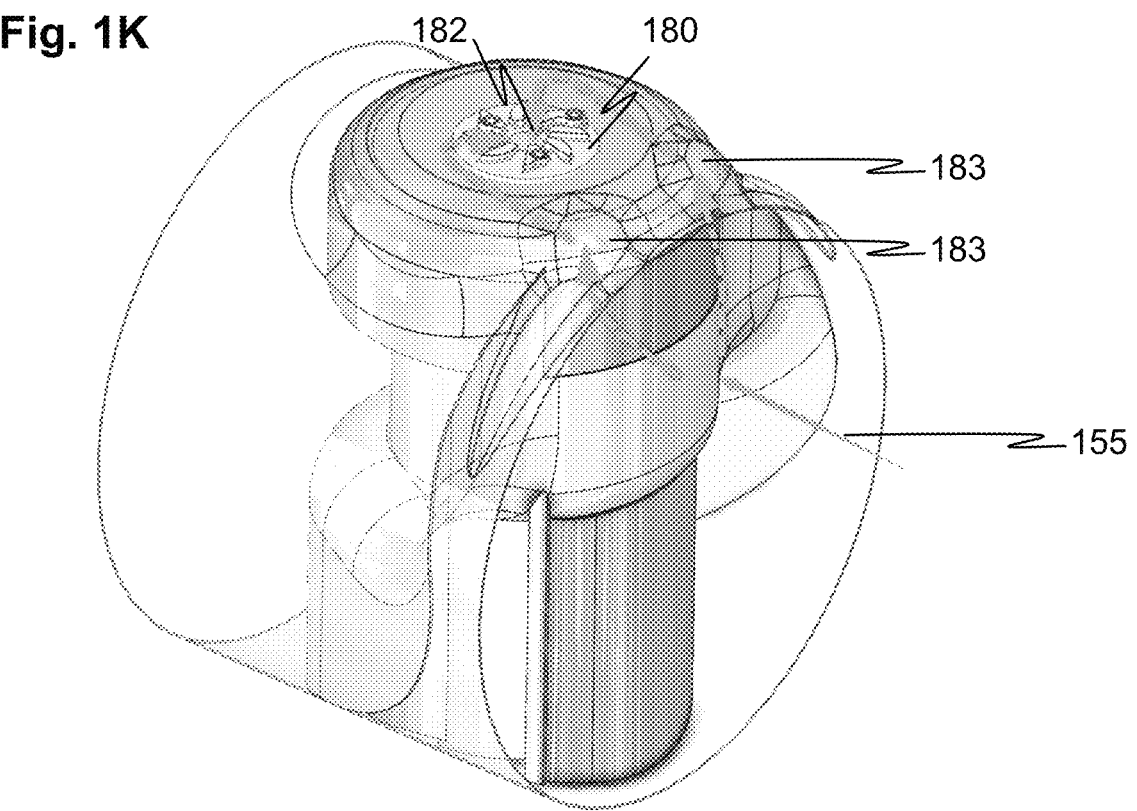
Figure 1L:
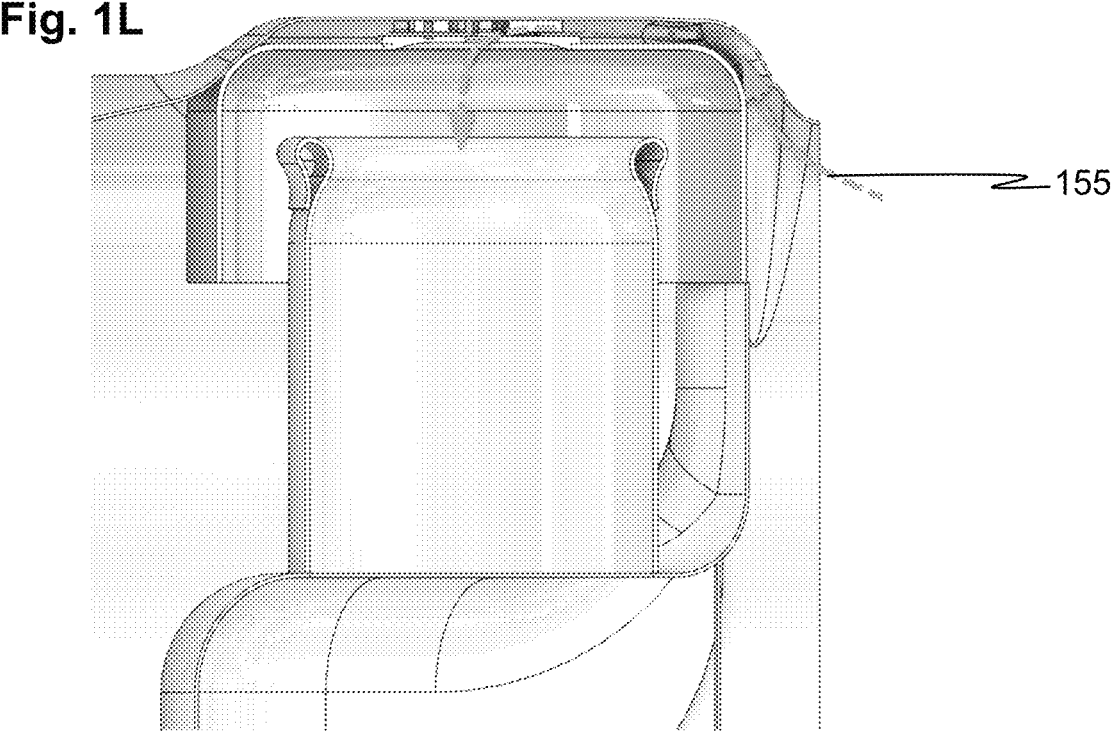

FIG. 1*l* shows different views of an embodiment with four wing segments.

FIG. 1J shows different views of an embodiment with four wing segments that are discontinuously arcuate. Here, the wings segments are formed of a base part that forms a portion of the mixing tube and has a first radius of curvature, and a planar or curved extending part that differs does not have the first radius of curvature. FIG. 1J further illustrates that the wing segment may have a variable radial reach outwards of the mixing tube. For example, the wing segment may have a sloping shape such that the radial reach reduces towards the second end of the mixing tube.

The wing segments may be evenly spaced. The wing segments may be aligned in longitudinal direction of the mixing tube. The wing segments may have an equal length in the longitudinal direction of the mixing tube.

Figure 2:
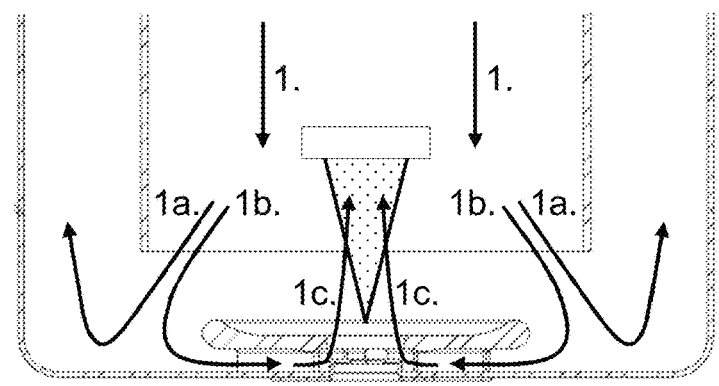
FIG. 2 shows some details of the mixer of FIG. 1A and an illustration of some flows in the mixer.

FIG. 2 shows some details of the mixer of FIG. 1B and an illustration of some flows in the mixer. The main flow 150 of FIG. 1A arrives in a mixing region as a first flow 1A. The first flow 1A is mostly directed as a first sub-flow towards the output 140 of FIG. 1A around an output end of the mixing tube. A second sub-flow directs a minority of the first flow through the stem guide and its central opening to a carrier flow 1*c* around the reactant doser for inhibiting accrual of the reactant on the reactant doser.

Figure 3A:
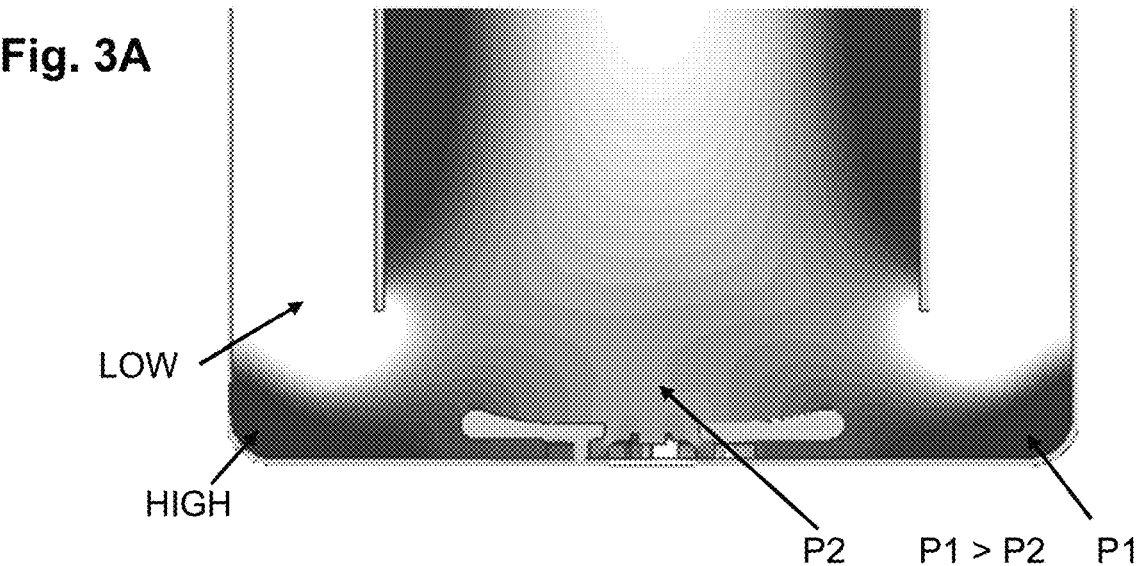
FIG. 3A shows simulated pressures of exhaust gas in the mixer.
Figure 3B:
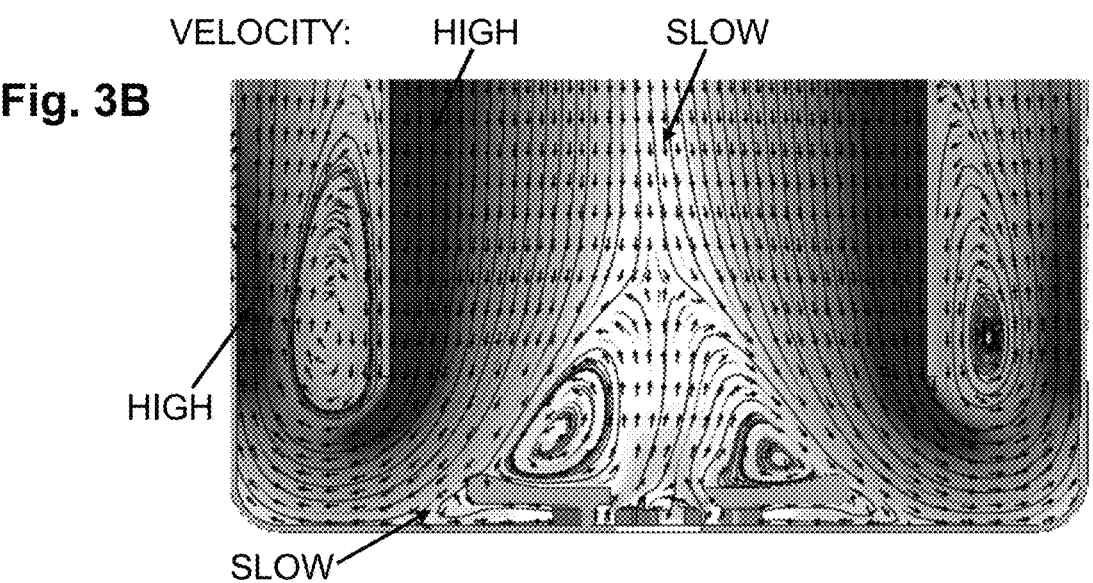
FIG. 3B shows simulated velocities of exhaust gas in the mixer.

FIG. 3A shows simulated pressures of exhaust gas in the mixer and FIG. 3B shows simulated velocities of exhaust gas in the mixer. A pressure difference is formed in this example embodiment by a geometry of the mixer. The geometry of the mixer causes a majority of the main flow to turn around the output end of the mixing tube such that a first portion of the turning flow closer to the stem guide has a lower velocity than a second portion of the turning flow farther apart from the stem guide, for incurring a higher pressure in the first portion than a pressure in the central opening.

FIG. 4A shows a throttling arrangement 400 for causing a pressure differential that produces the carrier flow around a reactant doser, according to an example embodiment. In comparison to the mixer 100 of FIG. 1A, in this arrangement, there is a throttling formed by throttling elements 410 that form a throttling structure. In result, the pressure difference is formed so that the carrier flow is induced. In another alternative, the dimensioning of a passage between the turning end of the mixing chamber and the output end of the mixing tube produces a suitable throttling to induce the pressure difference.

FIG. 4B shows a splitting arrangement 400 for splitting a side flow by a splitting element 420 for producing the carrier flow around a reactant doser, according to an example embodiment.

FIGS. 4A and 4B show only one side of the mixing chamber at the turning end 112. The remaining side can be similar or different. For example, there may be one or more throttling elements and one or more splitting elements 420 for collectively forming the carrier flow around the reactant doser.

FIG. 5 shows a view of a reactant doser 170 when mounted to the mixer, according to an example embodiment. The reactant doser 170 is mounted to the mixing chamber with bolts 510.

Figure 6:
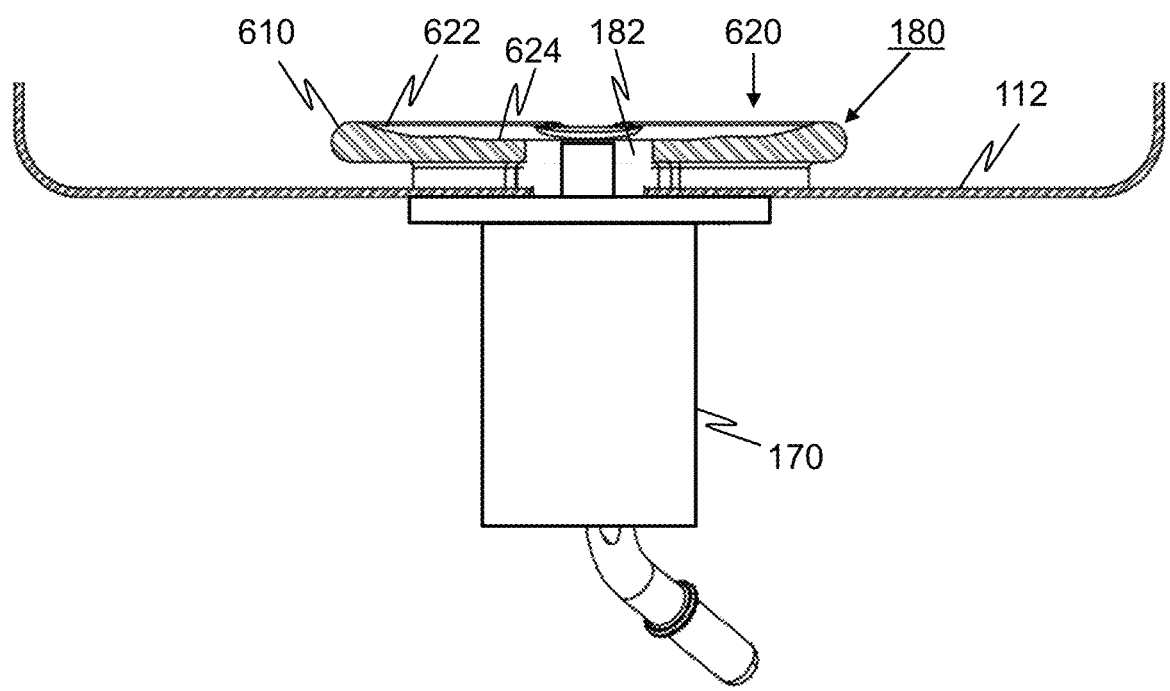
FIG. 6 shows a section view of a stem guide, reactant doser, and turning end of a mixer, according to an example embodiment.

FIG. 6 shows a section view of the stem guide, reactant doser, and turning end of FIG. 5. The stem guide 180 comprises a disc 610 and a stem part 620 that forms a flow passage from around the stem guide 180 to the central opening 182. The disc has a front face 620 that facing away from the turning end 112. The front face 620 may have at least one concave portion 622. Alternatively, or additionally, the front face 620 may have at least one planar portion 624.

Figure 7:
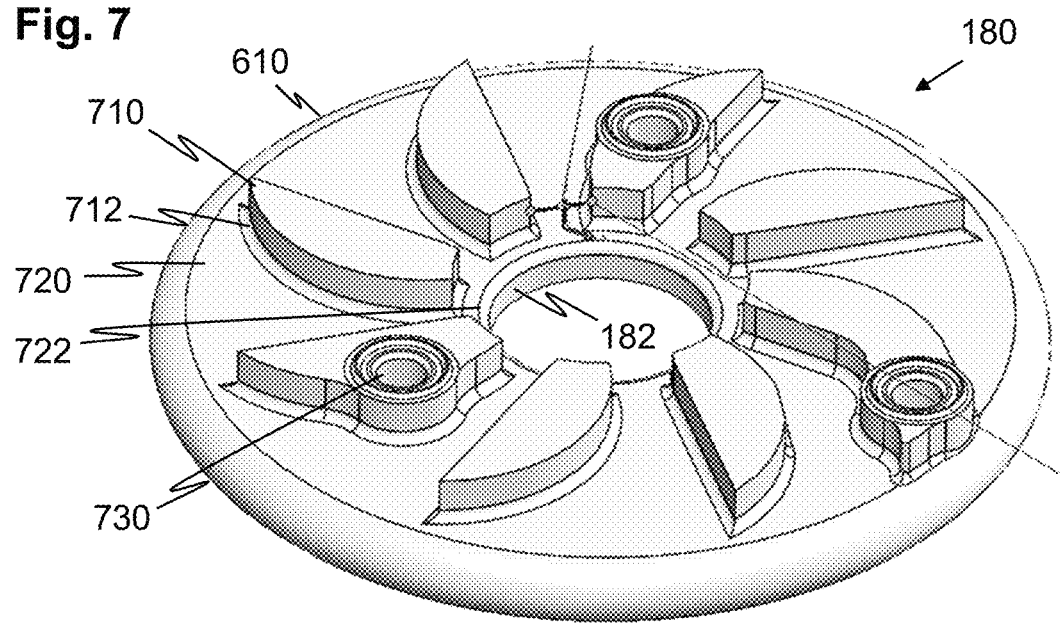
FIG. 7 shows the stem guide of FIG. 6 from behind.

FIG. 7 shows the stem guide of FIG. 6 from behind. A plurality of wings 710 are provided on the backside 720 of the disc 610, i.e., between the disc 610 and the turning end 112. The wings comprise fairings 712 on a backside.

In another example embodiment the wings are formed to the turning end 112, but it is easier to form the wings to the stem guide 180. In an example embodiment, the reactant doser 170 is mounted by three bolts such that the reactant doser 170 can be mounted in only one angle. A base of the reactant doser is formed to provide bolt holes and the stem guide defines corresponding stem guide holes 730. The stem guide holes 730 can be threaded so that the reactant doser can be bolted through the turning end to the stem guide 180. Alternatively, the stem guide 180 can be fitted with protruding threaded bars or bolts such that the reactant doser 170 is attached with nuts.

In FIG. 7, the wings are equidistantly arranged with equal inset at radially inner and outer ends. Some of the wings are locally expanded to form the stem guide holes with sufficient wall thickness. The wings are wing shaped, as they comprise fairings configured to reduce turbulence on a rear side in view of incoming exhaust gas. A facing side or front face of the wings is here planar. Alternatively, the front face may have a concave portion. The front face may be at an turned towards incoming gas flow in comparison to a radial direction. An The angle between the front face and a radius of the disc 610 may be at most 5; 10; or 20 degrees.

FIG. 7 shows a rounding or a bezel 722 formed on the back face 720 in an input edge of the central opening 182.

FIG. 8 shows a flow chart according to an example embodiment illustrating a process comprising various possible steps including some optional steps while also further steps can be included and/or some of the steps can be performed more than once:

- 800: feeding a rotating flow of exhaust gas in a mixing tube towards a turning end of a mixing chamber;
- 801: dosing reactant by a reactant doser against the rotating flow around a centreline of the mixing tube;
- 802: maintaining a stem guide around the reactant doser such that a front face of the stem guide faces the rotating flow, and the stem guide defines a central opening surrounding the reactant doser;
- 803: forming a pressure difference between a periphery of the stem guide and the mixing chamber around the stem guide;
- 804: guiding a side flow out of the rotating flow to a carrier flow around the reactant doser via the central opening, e.g., using the pressure difference;
- 805: inhibiting by the stem guide turbulence from being transferred from the side flow to the carrier flow;
- 806: forming the pressure difference by a geometry of the mixer;
- 807: forming the pressure difference by throttling the main flow downstream of the stem guide;
- 808: inhibiting the turbulence by guiding the side flow via stem guide channels that feed the side flow by a plurality of radial outputs to the central opening; and/or
- 809: inhibiting the turbulence so that the carrier flow is laminar around the reactant doser.

Figure 9:
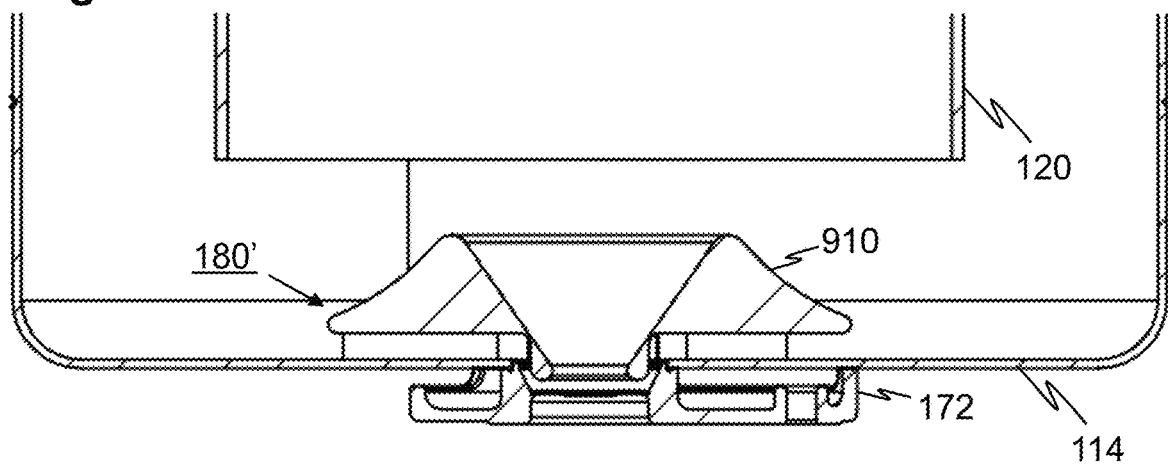
FIG. 9 shows a stem guide of another example embodiment with an external reactant doser mounting.

FIG. 9 shows a stem guide 180' of another example embodiment with an external reactant doser mount 172 for reactant doser attachment. The external reactant doser mount 172 can be attached to the mixing chamber 114 in various ways. For example, the reactant doser mount 172 may be welded to the mixing chamber 114, bolted or riveted through the mixing chamber 114 to the stem guide 180', or attached by bolts or screws to the mixing chamber 114.

FIG. 9 shows an alternative mixing tube side shape in the stem guide 180'. Here, the stem guide 180' comprises a cone 910 towards the mixing tube 120. The cone 910 may have straight inner surfaces. The cone 910 may have also a straight outer slope. Here, the cone 910 has curved outer slope for reducing turbulence of a flow that passes by the stem guide 180'.

Alternatively, the stem guide of any other example embodiment can be used in conjunction with the external reactant doser mount 172 (FIGS. 1C; 9).

Figure 10:
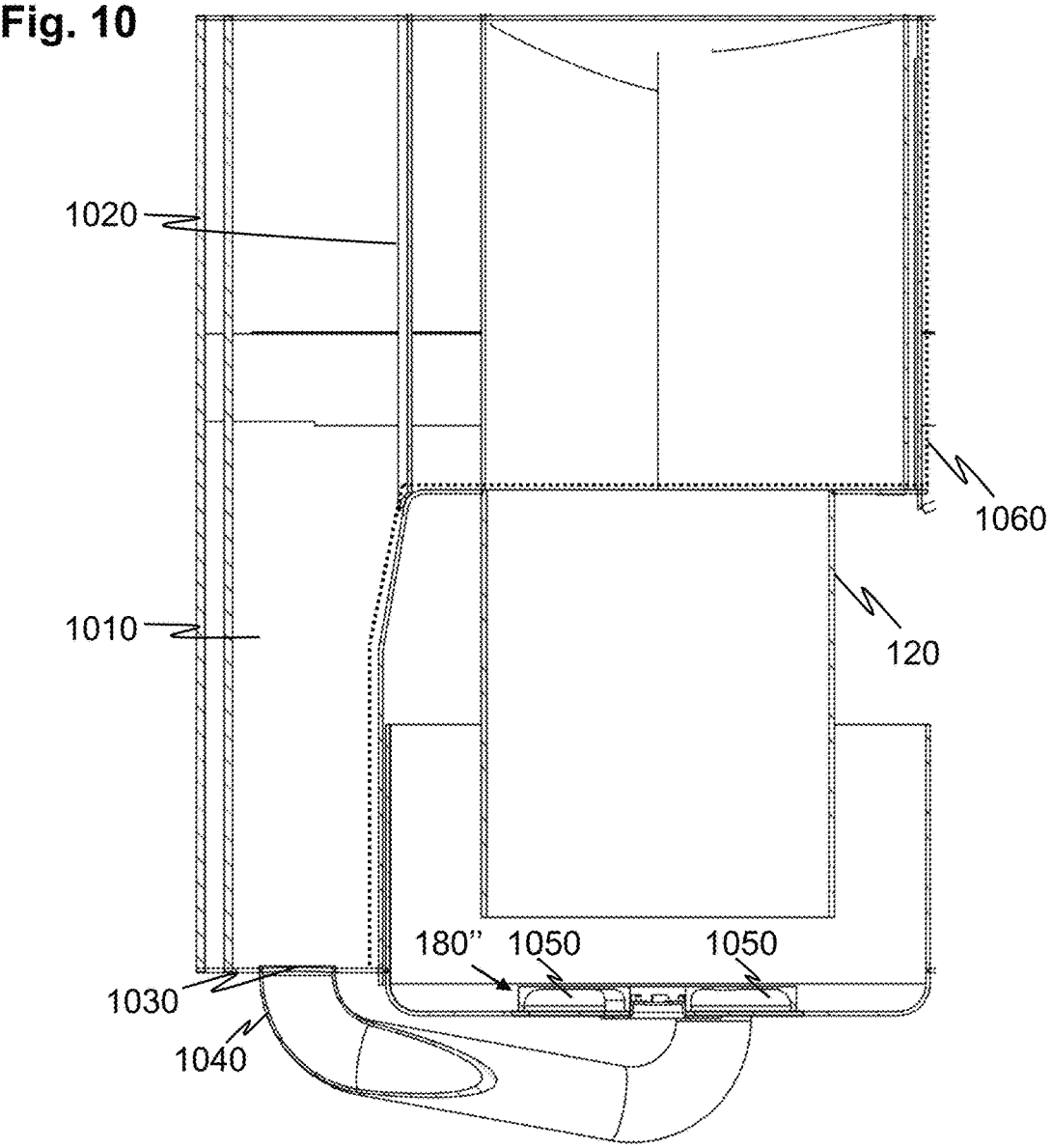
FIG. 10 shows a stem guide of another example embodiment with an external bypass feed.

FIG. 10 shows a stem guide 180" of yet another example embodiment with an external bypass feed 1030. Here, an exhaust gas feed line 1010 outputs exhaust gas to the mixing tube 120 and also via another branch or bypass 1040 to the stem guide 180" for forming or for enhancing the carrier flow. The bypass 1040 may increase the pressure of exhaust gas fed to the central opening. FIG. 10 further shows one side 1020 of a wing element.

In FIG. 10, there is further a peripheral distribution channel 1050 surrounding the central opening and distributing exhaust gas around the reactant doser tip. As drawn, the peripheral distribution channel may have a greater cross-sectional area at a feed point and a smaller cross-sectional area distantly from the feed point so as to even the distribution of the exhaust gas to the carrier flow around the central opening.

As in the embodiment of FIG. 10, the feed to central opening is provided over both sides without any rotational bias, the blades shown in FIG. 7 may be omitted for reducing pressure loss.

FIG. 10 further shows the divider as indicated by an added dashed trace line 1060.

In an example embodiment, the stem guide is closed except the central opening. In another example embodiment, the stem guide comprises one or more Venturi input ports (not shown) can be configured to introduce exhaust gas from the mixing chamber, preferably from a peripheral area around the stem guide.

FIG. 1l shows a flow chart of a method in a mixer according to an example embodiment, comprising:

- 1100: feeding a rotating flow of the first portion of exhaust gas in the mixing tube towards a turning end of a mixing chamber;
- 1101: dosing reactant by a reactant doser against the rotating flow around a centreline of the mixing tube;
- 1102: maintaining a stem guide around the reactant doser such that a front face of the stem guide faces the rotating flow, and the stem guide defines a central opening surrounding the reactant doser; and/or
- 1103: guiding exhaust gas to a carrier flow around the reactant doser via the central opening.

The method may further comprise any one or more of:

- 1104: upstream from the feeding of the rotating flow of the first portion in the mixing tube, branching a first portion exhaust gas supply partly to a mixing tube and a second branch to a carrier flow input;

1105: guiding exhaust gas from the carrier flow input to the carrier flow;

1106: guiding a side flow out of the rotating flow through the central opening to the carrier flow; and/or 1107: inhibiting the turbulence by guiding the side flow via stem guide channels that feed the side flow by a plurality of radial outputs to the central opening.

In an example embodiment, there is provided a mixer comprising means for performing the method of any example embodiment.

FIG. 12 shows a flow chart of a method in a flow guide according to an example embodiment, comprising:

1200: defining a mixing chamber comprising an input side and an output side;

1201: dividing the mixing chamber by a divider to the input side and the output side;

1202: supporting a mixing tube in place inside the mixing chamber, optionally in a perpendicular orientation with relation to the mixing chamber; the mixing tube comprising a first end and a second end, an intake section; and a dosing section between the intake section and the second end;

1203: receiving exhaust gas by the intake section from the input side of the mixing chamber;

1204: guiding the received exhaust gas by a swirl guide to flow inside the mixing tube towards the second end as a rotating and advancing main flow;

1205: mounting a reactant doser by a reactant doser mount such that when in use, the reactant doser provides reactant to the dosing section;

1206: guiding exhaust gas through the divider by the mixing tube; and/or

1207: receiving at least most of the rotating and advancing exhaust gas flow by the dosing section.

In an example embodiment, the method further comprises

1208: dividing some of the main flow into a carrier flow for recirculation and allowing a remainder of the main flow to exit the flow device; and/or 1209: inhibiting the turbulence by guiding the side flow via stem guide channels that feed the side flow by a plurality of radial outputs to the central opening.

Advantageously, the dividing of some of the main flow into the carrier flow enhances transportation of the dosed reactant deeper into a core of the main flow well apart of any walls and other structures to which the reactant might accrue. While some of the main flow is recirculated and can thus recirculate a small portion of the dosed reactant to the carrier flow, such reactant is well dissolved and evaporated. Moreover, in case of supplementing the carrier flow with some exhaust gas fed by a bypass from the input side of the mixing chamber, reactant concentration in the carrier flow can be further reduced.

Figure 13A:
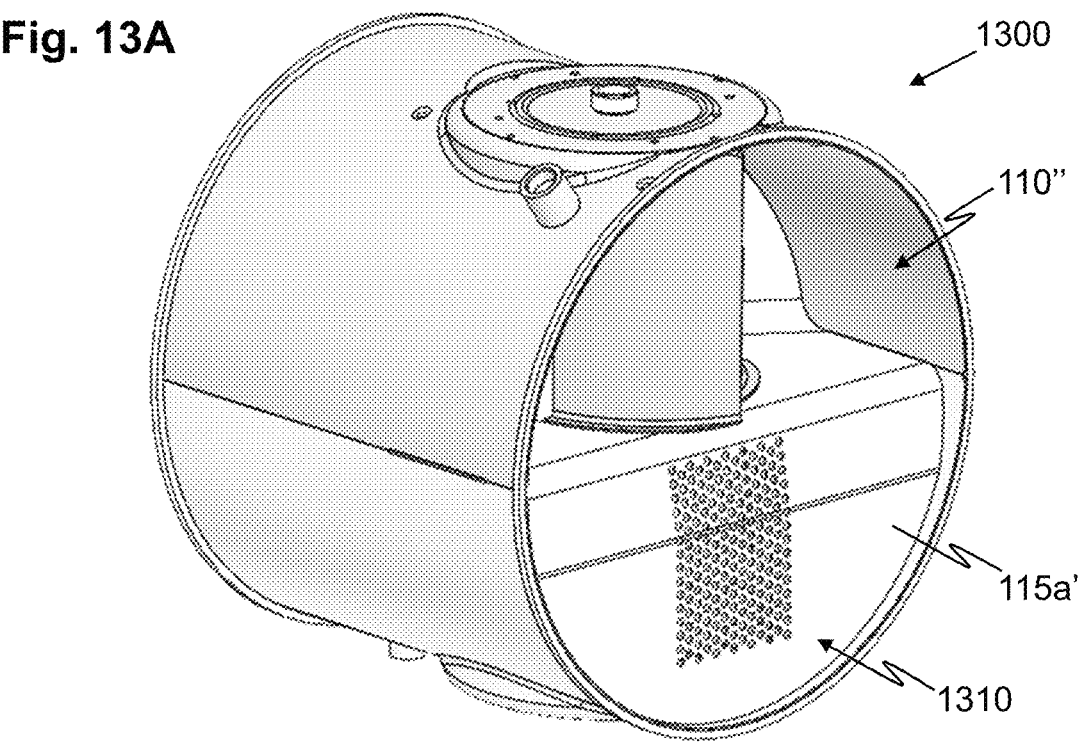
FIGS. 13A and 13B show a mixer with partial bypass according to an example embodiment.
Figure 13B:
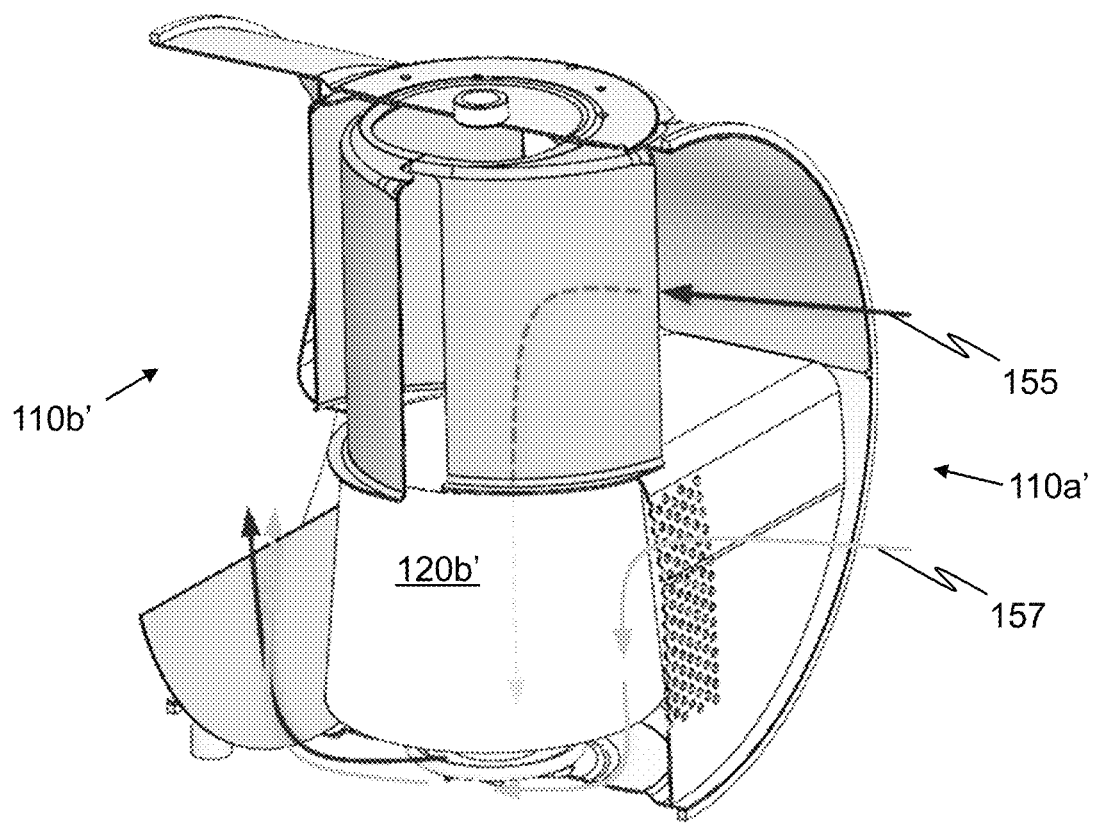

FIGS. 13A and 13B show a mixer 1300 with partial bypass according to an example embodiment, in which some exhaust gas 155 is fed through an internal bypass 1310 to an output side of a mixing chamber 110" for reducing counter pressure. The mixer 1300 of FIG. 13 further comprises a divider 115a' dividing the mixing chamber 110" to an input side 110a' and an output side 110b', and a dosing section 120b'. The internal bypass is formed in FIG. 13 on the divider. In an example embodiment, the internal bypass 1310 is formed to face the dosing section such that exhaust gas bypassing through the internal bypass 1310 becomes guided by an external surface of the dosing section. In an example embodiment, the internal bypass 1310 resides on a mixing tube output side half of the mixing chamber 110". In an example embodiment, the internal bypass 1310 is or comprises a perforation. In an example embodiment, the internal bypass 1310 is or comprises a grill. In an example embodiment, the internal bypass 1310 is or comprises an aperture.

In an example embodiment, the internal bypass 1310 is configured to allow a bypass portion of the exhaust gas flow 157 through the internal bypass 1310. In an example embodiment, the bypass portion is at least 1 weight percent. In an example embodiment, the bypass portion is at least 2 weight percent. In an example embodiment, the bypass portion is at least 5 weight percent. In an example embodiment, the bypass portion is at least 10 weight percent. In an example embodiment, the bypass portion is at least 20 weight percent. In an example embodiment, the bypass portion is at least 30 weight percent. In an example embodiment, the bypass portion is at most 2 weight percent. In an example embodiment, the bypass portion is at most 5 weight percent. In an example embodiment, the bypass portion is at most 10 weight percent. In an example embodiment, the bypass portion is at most 20 weight percent. In an example embodiment, the bypass portion is at most 30 weight percent. In an example embodiment, the bypass portion is at most 40 weight percent.

In an example embodiment, the internal bypass 1310 is configured to direct the bypass portion to bypass the mixing tube. In an example embodiment, the internal bypass 1310 is configured to direct the bypass portion to bypass swirl-inducing flow guide elements. In an example embodiment, the internal bypass 1310 is configured to direct the bypass portion to join a feed of the stem guide.

Various embodiments have been presented. It should be appreciated that in this document, words comprise; include; and contain are each used as open-ended expressions with no intended exclusivity.

The foregoing description has provided by way of non-limiting examples of particular implementations and embodiments a full and informative description of the best mode presently contemplated by the inventors for carrying out the invention. However, the invention is not restricted to details presented in the foregoing, but implementable in other embodiments using equivalent means or in different combinations of embodiments.

Furthermore, some of the features of the afore-disclosed example embodiments may be used to advantage without the corresponding use of other features. The foregoing shall be considered as merely illustrative of the principles of the present invention, and not in limitation, so only the appended claims limit the scope of the invention.

The invention claimed is:

1. A flow device for exhaust gas aftertreatment, comprising a mixing chamber comprising an input side and an output side;

a divider dividing the mixing chamber to the input side and the output side;

a mixing tube comprising a first end and a second end, and an intake section for receiving exhaust gas from the input side of the mixing chamber;

a swirl guide configured to guide the received exhaust gas to flow inside the mixing tube towards the second end as a rotating and advancing main flow; and a reactant doser mount for a reactant doser; wherein the mixing tube comprises a dosing section between the intake section and the second end;

the mixing tube extends through the divider;

the dosing section is configured to receive at least most of the rotating and advancing main flow; and the reactant doser mount is configured for mounting the reactant doser such that when in use, the reactant doser provides reactant to the dosing section;

the flow device further comprising a stem guide around the doser when mounted such that a front face of the stem guide faces the rotating and advancing main flow, and the stem guide defines a central opening surrounding the doser when mounted;

wherein the stem guide comprises a passage structure for guiding a side flow out of the rotating and advancing main flow to a carrier flow around the doser via the central opening.

2. The flow device of claim 1, wherein the divider comprises
a first guide between the mixing tube and the output side of the mixing chamber; and
a second guide between the mixing tube and the input side of the mixing chamber.

3. The flow device of claim 2, wherein the first guide is concavely shaped when seen from the input side of the mixing chamber, for providing more space on the output side for spreading exhaust gas flow into a next processing phase.

4. The flow device of claim 3, wherein the second guide has an inclination for facilitating flow of exhaust gas towards intake section.

5. The flow device of claim 3, wherein the mixing tube comprises a conical part with a diameter expanding in downstream direction of the main flow, wherein the conical part is closer to the second end of the mixing tube than to the first end of the mixing tube.

6. The flow device of claim 2, wherein the second guide has an inclination for facilitating flow of exhaust gas towards intake section.

7. The flow device of claim 6, wherein the mixing tube comprises a conical part with a diameter expanding in downstream direction of the main flow, wherein the conical part is closer to the second end of the mixing tube than to the first end of the mixing tube.

8. The flow device of claim 2, wherein the mixing tube comprises a conical part with a diameter expanding in downstream direction of the main flow, wherein the conical part is closer to the second end of the mixing tube than to the first end of the mixing tube.

9. The flow device of claim 2, wherein the mixing tube resides substantially perpendicularly in the mixing chamber such that a longitudinal axis of the mixing tube is substantially perpendicular to a longitudinal direction of the mixing chamber.

10. The flow device of claim 1, wherein the mixing tube comprises a conical part with a diameter expanding in downstream direction of the main flow, wherein the conical part is closer to the second end of the mixing tube than to the first end of the mixing tube.

11. The flow device of claim 1, wherein the mixing tube resides substantially perpendicularly in the mixing chamber such that a longitudinal axis of the mixing tube is substantially perpendicular to a longitudinal direction of the mixing chamber.

12. The flow device of claim 1, wherein the swirl guide is integrally formed with the intake section of the mixing tube.

13. The flow device of claim 1, further comprising a turning end in the mixing chamber opposite to the second end of the mixing tube for reversing the main flow after exiting the second end of the mixing tube to flow along an outer surface of the mixing tube towards the first end.

14. The flow device of claim 13, wherein the doser mount resides at the turning end such that when mounted and in use, the reactant doser will dose reactant against the rotating and advancing main flow around a centreline of the mixing tube.

15. The flow device of claim 1, wherein the passage structure is configured to inhibit turbulence from being transferred from the side flow to the carrier flow.

16. The flow device of claim 1, wherein the passage structure comprises a plurality of guide channels configured to feed the side flow by a plurality of radial outputs to the central opening.

17. The flow device of claim 1, wherein the stem guide comprises a disc that in part together with the turning end defines the passage structure.

18. A method comprising:
defining a mixing chamber comprising an input side and an output side;
dividing the mixing chamber by a divider to the input side and the output side;
supporting a mixing tube in place inside the mixing chamber, the mixing tube comprising a first end and a second end, an intake section; and a dosing section between the intake section and the second end;
receiving exhaust gas by the intake section from the input side of the mixing chamber;
guiding the received exhaust gas by a swirl guide to flow inside the mixing tube towards the second end as a rotating and advancing main flow;
supporting a reactant doser by a reactant doser mount such that when in use, the reactant doser provides reactant to the dosing section;
guiding exhaust gas through the divider by the mixing tube; and
receiving at least most of the rotating and advancing exhaust gas main flow by the dosing section;
facing the rotating and advancing main flow by a front face of a stem guide; and
defining by the stem guide a central opening surrounding the doser;
wherein the stem guide comprises a passage structure for guiding a side flow out of the rotating and advancing main flow to a carrier flow around the doser via the central opening.

* * * * *